(12) United States Patent
Roy

(10) Patent No.: US 11,634,062 B1
(45) Date of Patent: Apr. 25, 2023

(54) VEHICLE HAVING DIVISIBLE TRUNK FOR SEPARATELY HEATING AND COOLING DIVIDED TRUNK COMPARTMENTS BASED ON OBJECT RECOGNITION

(71) Applicant: Matthew Macgregor Roy, Ottawa (CA)

(72) Inventor: Matthew Macgregor Roy, Ottawa (CA)

( * ) Notice: Subject to any disclaimer, the term of this patent is extended or adjusted under 35 U.S.C. 154(b) by 297 days.

(21) Appl. No.: 17/214,904

(22) Filed: Mar. 28, 2021

Related U.S. Application Data

(60) Provisional application No. 63/009,756, filed on Apr. 14, 2020.

(51) Int. Cl.
*B60R 7/02* (2006.01)
*B60P 3/20* (2006.01)
*B60H 1/00* (2006.01)
*B60R 5/04* (2006.01)

(52) U.S. Cl.
CPC ......... *B60P 3/205* (2013.01); *B60H 1/004* (2013.01); *B60H 1/00271* (2013.01); *B60H 1/00742* (2013.01); *B60H 1/00985* (2013.01); *B60R 5/04* (2013.01); *B60R 7/02* (2013.01)

(58) Field of Classification Search
CPC ..... B60P 3/205; B60H 1/00271; B60H 1/004; B60H 1/00742; B60H 1/00985; B60R 5/04; B60R 7/02
USPC .................................................... 296/24.41
See application file for complete search history.

(56) References Cited

U.S. PATENT DOCUMENTS

| | | | |
|---|---|---|---|
| 10,202,069 B2* | 2/2019 | Salter | B60Q 3/225 |
| 10,618,447 B2* | 4/2020 | Putcha | B60P 3/20 |
| 10,703,288 B2* | 7/2020 | Stojkovic | H01M 10/613 |
| 10,913,329 B2* | 2/2021 | Roesemann | B60H 1/26 |
| 2009/0218849 A1* | 9/2009 | Rupar | B60R 5/04 296/182.1 |
| 2010/0090502 A1* | 4/2010 | Mercurio | B60R 13/013 296/193.07 |
| 2014/0309805 A1* | 10/2014 | Ricci | G06F 16/951 701/1 |
| 2019/0105966 A1* | 4/2019 | Roesemann | B60H 1/247 |
| 2021/0155071 A1* | 5/2021 | Lange | B60H 1/00271 |
| 2022/0289113 A1* | 9/2022 | Salter | B60R 7/04 |

FOREIGN PATENT DOCUMENTS

DE 102016215403 A1 * 2/2018

* cited by examiner

*Primary Examiner* — Pinel E Romain

(57) ABSTRACT

A vehicle includes a divisible trunk defining an enclosure for storing a first object and a second object, a camera to capture first and second images of the first and second objects prior to being placed into the divisible trunk and a processor to execute a machine-vision module to process first and second image data to identify the first and second objects. The vehicle includes a trunk divider to divide the trunk into first and second trunk compartments and an actuator to displace the trunk divider from an inoperative position to an operative position. The processor outputs a divider signal to the actuator to displace the divider to divide the trunk into the first and second trunk compartments. The processor outputs a thermal control signal to a thermal controller to control first and second temperatures of the first and second trunk compartments by setting first and second setpoint temperatures.

20 Claims, 39 Drawing Sheets

VEHICLE HAVING DIVISIBLE TRUNK FOR SEPARATELY HEATING AND COOLING DIVIDED TRUNK COMPARTMENTS BASED ON OBJECT RECOGNITION

CROSS-REFERENCE TO RELATED APPLICATIONS

This application claims priority from U.S. Provisional Patent Application 63/009,756 entitled "VEHICLE HAVING DIVISIBLE TRUNK FOR SEPARATELY HEATING AND COOLING DIVIDED TRUNK COMPARTMENTS BASED ON OBJECT RECOGNITION" filed Apr. 14, 2020.

TECHNICAL FIELD

The present invention relates generally to vehicles and, in particular, to trunks of vehicles.

BACKGROUND

Vehicles such as sedans, coupes and sports cars have enclosed trunks that are separate from their cabins unlike station wagons, minivans or sport utility vehicles. The trunks of sedans, coupes and sports cars are designed to carry or transport any number of objects, belongings or items such as groceries, suitcases, sports equipment, etc. Some objects are temperature-sensitive, such as some types of groceries, e.g. ice cream or other frozen foods. Technologies exist to air-condition the trunk. However, it may be wasteful or undesirable to cool the entire trunk just for one item or for a few items, particularly if there are other objects in the trunk that the user does not wish to cool (e.g. warm take-out food). Similarly, in very cold weather, it may be desirable to heat the trunk to keep objects in the trunk from becoming too cold.

A vehicle trunk technology to enable transportation of objects at suitable temperatures is highly desirable.

SUMMARY

In general, the present invention provides a vehicle with a divisible trunk defining an enclosure for storing a first object and a second object, a camera to capture first and second images of the first and second objects prior to being placed into the divisible trunk and a processor to execute a machine-vision module to process first and second image data to identify the first and second objects. The vehicle includes a trunk divider to divide the trunk into first and second trunk compartments and an actuator to displace the trunk divider from an inoperative position to an operative position. The processor outputs a divider signal to the actuator to displace the divider to divide the trunk into the first and second trunk compartments. The processor outputs a thermal control signal to a thermal controller to control first and second temperatures of the first and second trunk compartments by setting first and second setpoint temperatures.

An aspect of the disclosure is a vehicle that includes a divisible trunk defining an enclosure for storing a first object and a second object, a camera to capture a first image of the first object prior to being placed into the divisible trunk and to capture a second image of the second object prior to being placed into the divisible trunk, the camera generating first image data of the first image and second image data of the second image. The vehicle includes a processor communicatively connected to the camera to receive the first and second image data of the first and second images, wherein the processor executes a machine-vision module to process the first and second image data to identify the first and second objects. The vehicle also includes a trunk divider shaped and sized to divide the divisible trunk into a first trunk compartment and a second trunk compartment. The vehicle further includes an actuator connected to the trunk divider to displace the trunk divider from an inoperative position in which the divisible trunk is undivided to an operative position in which the divisible trunk is divided into the first and second trunk compartments. The processor is configured to generate and output a divider signal to the actuator to cause the actuator to displace the trunk divider to divide the divisible trunk into the first and second trunk compartments. The processor also generates and outputs a thermal control signal to a thermal controller to control a first temperature of the first trunk compartment by setting a first setpoint temperature for the first trunk compartment and to control a second temperature of the second trunk compartment by setting a second setpoint temperature for the second trunk compartment.

Another aspect of the disclosure is a vehicle that includes a trunk defining an enclosure for storing an object, a camera to capture an image of the object prior to being placed into the trunk, the camera generating image data of the image. The vehicle includes a processor communicatively connected to the camera to receive the image data of the image, wherein the processor executes a machine-vision module to process the image data to identify the object. The processor generates and outputs a thermal control signal to a thermal controller to control a temperature of the trunk by setting a setpoint temperature for the trunk compartment.

Another aspect of the disclosure is a vehicle includes a divisible trunk defining an enclosure for storing a first object and a second object. The vehicle also includes a trunk divider shaped and sized to divide the divisible trunk into a first trunk compartment and a second trunk compartment. The vehicle further includes an actuator connected to the trunk divider to displace the trunk divider from an inoperative position in which the divisible trunk is undivided to an operative position in which the divisible trunk is divided into the first and second trunk compartments. The processor is configured to generate and output a divider signal to the actuator to cause the actuator to displace the trunk divider to divide the divisible trunk into the first and second trunk compartments.

Yet another aspect of the disclosure is a method of using a vehicle to transport a first object and a second object in a divisible trunk defining an enclosure. The method entails capturing, using a camera a first image of the first object prior to being placed into the divisible trunk and capturing, using the camera, a second image of the second object prior to being placed into the divisible trunk. The camera generates first image data of the first image and second image data of the second image. The method entails receiving, by a processor, the first and second image data of the first and second images, and processing the first and second image data, using a machine-vision module executed by the processor, to identify the first and second objects. The method entails generating and outputting by the processor a divider signal to an actuator. The method entails causing the actuator to displace a trunk divider to divide the divisible trunk into the first and second trunk compartments. The method also entails generating and outputting, by the processor, a thermal control signal to a thermal controller to control a first temperature of the first trunk compartment by setting a first setpoint temperature for the first trunk compartment and to control a second temperature of the second trunk compartment by setting a second setpoint temperature for the second trunk compartment.

The foregoing presents a simplified summary of the invention in order to provide a basic understanding of some aspects of the invention. This summary is not an exhaustive overview of the invention. It is not intended to identify essential, key or critical elements of the invention or to delineate the scope of the invention. Its sole purpose is to present some concepts in a simplified form as a prelude to the more detailed description that is discussed later. Other aspects of the invention are described below in relation to the accompanying drawings.

BRIEF DESCRIPTION OF THE DRAWINGS

Further features and advantages of the present technology will become apparent from the following detailed description, taken in combination with the appended drawings, in which.

It will be noted that throughout the appended drawings, like features are identified by like reference numerals.

DETAILED DESCRIPTION

Figure 1:
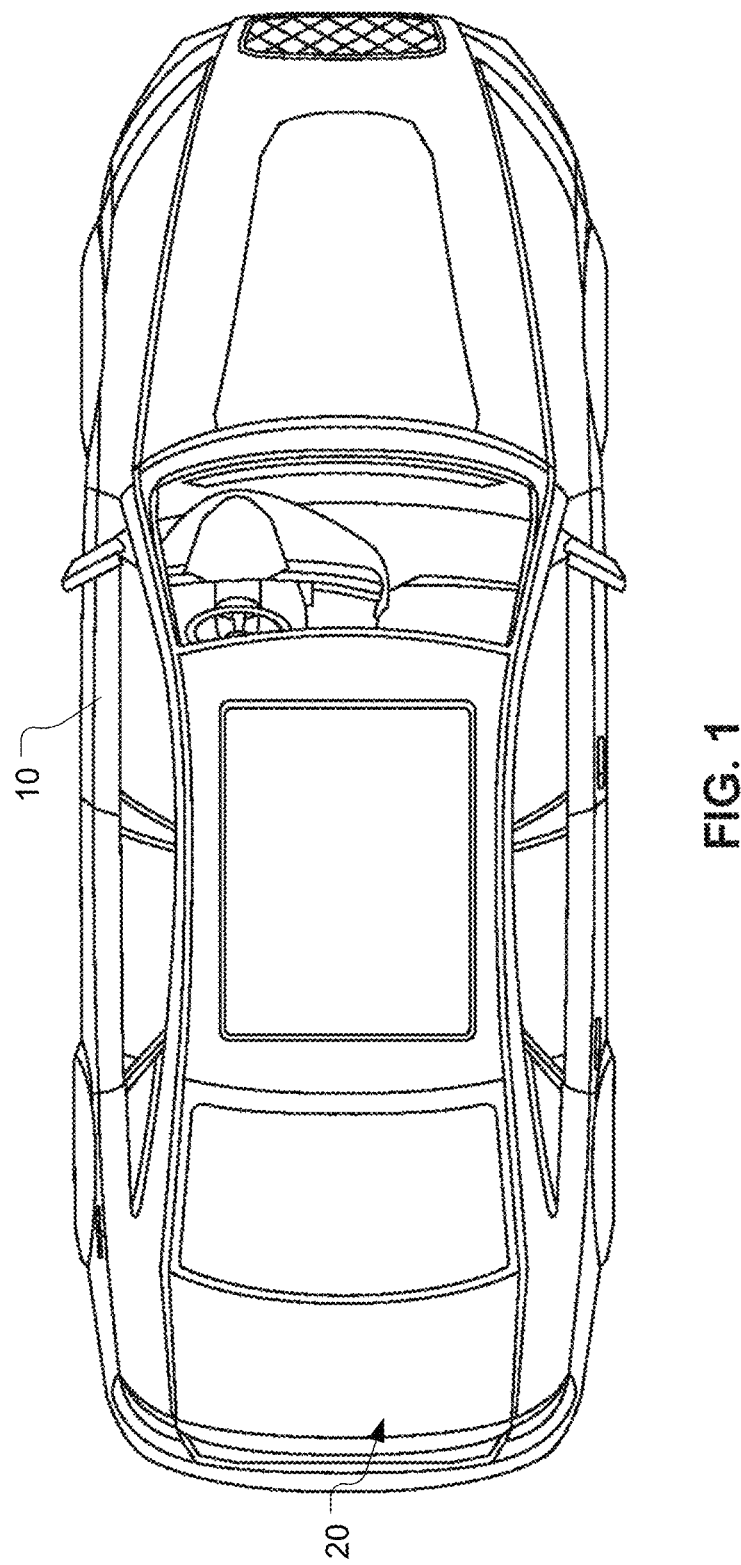
FIG. 1 is a top view of a vehicle in accordance with an embodiment of the present invention.
Figure 2:
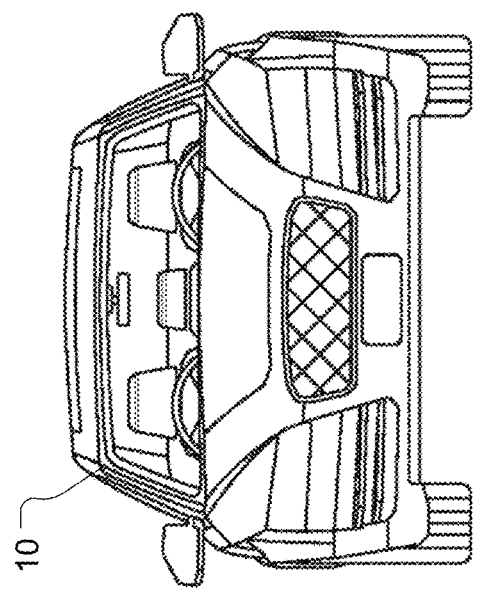
FIG. 2 is a front view of the vehicle of FIG. 1.
Figure 3:
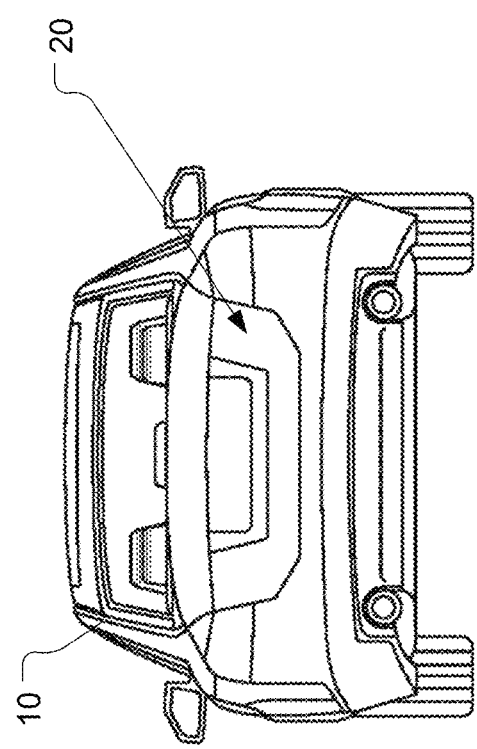
FIG. 3 is a rear view of the vehicle of FIG. 1.
Figure 4:
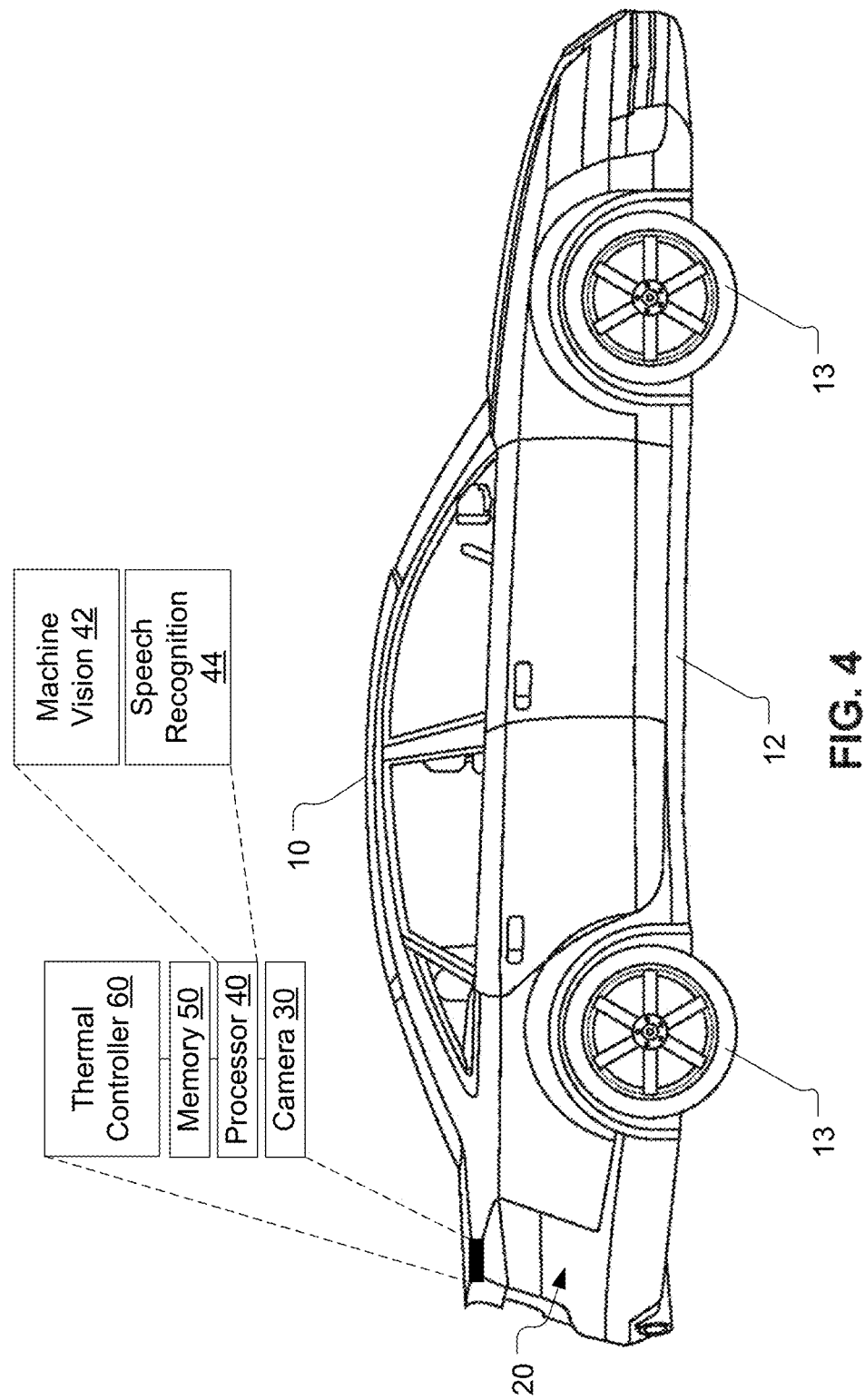
FIG. 4 is a right side view of the vehicle of FIG. 1.

Disclosed herein are various embodiments of a vehicle having a divisible trunk defining an enclosure for storing a first object and a second object, a camera to capture first and second images of the first and second objects prior to being placed into the divisible trunk and a processor to execute a machine-vision module to process first and second image data to identify the first and second objects. The vehicle includes a trunk divider to divide the trunk into first and second trunk compartments and an actuator to displace the trunk divider from an inoperative position to an operative position. The processor outputs a divider signal to the actuator to displace the divider to divide the trunk into the first and second trunk compartments. The processor outputs a thermal control signal to a thermal controller to control first and second temperatures of the first and second trunk compartments by setting first and second setpoint temperatures for the first and second trunk compartments, respectively.

For the purposes of this specification, the term "vehicle" is meant to encompass a car having a trunk that is separate from the cabin, such as a sedan, coupe or sports car. The vehicle is generally not intended to include minivans, hatchbacks, station wagons, and sport utility vehicles which include a rear storage area that is open to the cabin except where the vehicle has a trunk cover, rear platform or like structure that encloses a volume to thereby effectively define a trunk. The vehicle may be a motorcycle, moped, scooter, all-terrain vehicle, motorboat, sailboat, etc. that has a trunk or functionally equivalent storage compartment into which one or more objects may be placed for transport.

FIGS. 1-5 depict one exemplary implementation of a vehicle 10. The vehicle 10 may be an autonomous vehicle (AV), i.e. a self-driving vehicle, or a human-driven vehicle or a mixed-mode vehicle that has an assisted-driving system for partially driving the vehicle 10 in conjunction with driver input. The vehicle 10 may be gas powered, electric, hybrid-electric, hydrogen-powered or powered by any other means. The vehicle 10 includes, in the illustrated embodiment, a vehicle chassis 12 and a plurality of wheels 13. The vehicle 10 includes an engine or electric motor supported by the chassis and mechanically connected to one or more of the wheels for providing traction to the one or more of the wheels. The vehicle includes a braking system and a steering system for steering the vehicle via a steering mechanism.

The vehicle 10 depicted by way of example in FIGS. 1-5 includes a trunk 20 for storing and carrying objects. The trunk 20 may be used to carry groceries, electronics, or other items that may be temperature-sensitive. As depicted in FIGS. 1-5, the trunk 20 defines an enclosure for storing multiple objects, i.e. a first object and a second object, although there may be more than two objects placed in the trunk. The trunk 20 defines a fully enclosed volume and has a lid 21 that opens to enable a user to insert or place the first and second objects inside the trunk 20. In some embodiments, the trunk 20 includes a lower (floor) surface, a rear wall, a left side wall, a right side wall, a front wall and a top surface. The lid 21 may be disposed within, for example, the front wall or top surface. In a variant, the lid 21 may constitute the front wall or top surface. Although the trunk is shown in the rear portion of the vehicle 10, as it common in most vehicles, it will be appreciated that the trunk may in a forward portion of the vehicle.

The vehicle 10 includes a camera 30 (e.g. digital camera) to capture a first image of the first object and a second image of the second object prior to being placed into the trunk 20. The camera 30 may capture multiple images of the first object and multiple images of the second object. The camera 30 generates first image data of the first image and second image data of the second image. The image data may be generated in any suitable data format. In one embodiment, the camera 30 is disposed on an inside lid 21 of the trunk 20 of the vehicle 10. In one embodiment, the camera 30 is a backup camera of the vehicle 10.

The vehicle 10 includes a processor 40 (e.g. microprocessor, microcontroller, etc.) communicatively connected to the camera 30 to receive the first and second image data of the first and second images. The vehicle 10 may have multiple processors in a variant. The processor 40 executes a machine-vision module 42 to process the first and second image data to identify or recognize the first and second objects. For example, the machine-vision module 42 may be a software module executing instructions in computer-readable code programmatically or algorithmically defining a method or a process to analyze the first and second images in order to extract features of the first and second images so as to recognize the first and second objects. The machine-vision module 42 may implement a deep learning object recognition algorithm. Object detection may be performed using a neural network-based technique or a non-neural technique. For a non-neural technique, the module first defines features and then classifies objects using a support vector machine (SVM). Neural-network techniques may involve convolutional neural networks (CNN) such as region-based convolutional neural networks.

The vehicle 10 includes a memory 50 coupled to the processor 40. The memory may optionally store a database of images of known objects, or common objects, to enable a comparison with images from the camera to facilitate identification of the objects. The machine-vision module 42 may have multiple recognition algorithms specifically designed to identify different categories or types of objects, e.g. one for groceries, one for household goods, ones for clothes, ones for electronics, one for sports equipment, one for hardware, etc. The machine-vision module 42 may determine which algorithm to use based on the proximity to a particular store, as determined by the processor in conjunction with a GNSS receiver. For example, if the processor determines that the vehicle is parked beside a grocery store, the grocery algorithm is used to identify the objects. In another implementation, the mobile communication device may receive an electronic invoice listing all objects that the user has purchased. The invoice may be used to recognize the objects being loaded into the trunk. The user may also provide user input to the vehicle or mobile communication device to identify the objects.

In another embodiment, the camera 30 of the vehicle may read or scan a QR code or bar code. Alternatively or additionally to the camera 30, the vehicle may include an optically-scannable code reader such as a QR code reader or bar code reader to read the QR code or bar code on the object or its packaging. This enables identification of the object. The processor 40 of the vehicle 10 may consult a local database stored in the memory 50 or it may consult a remote database on a remote server by wireless communication.

Figure 5:
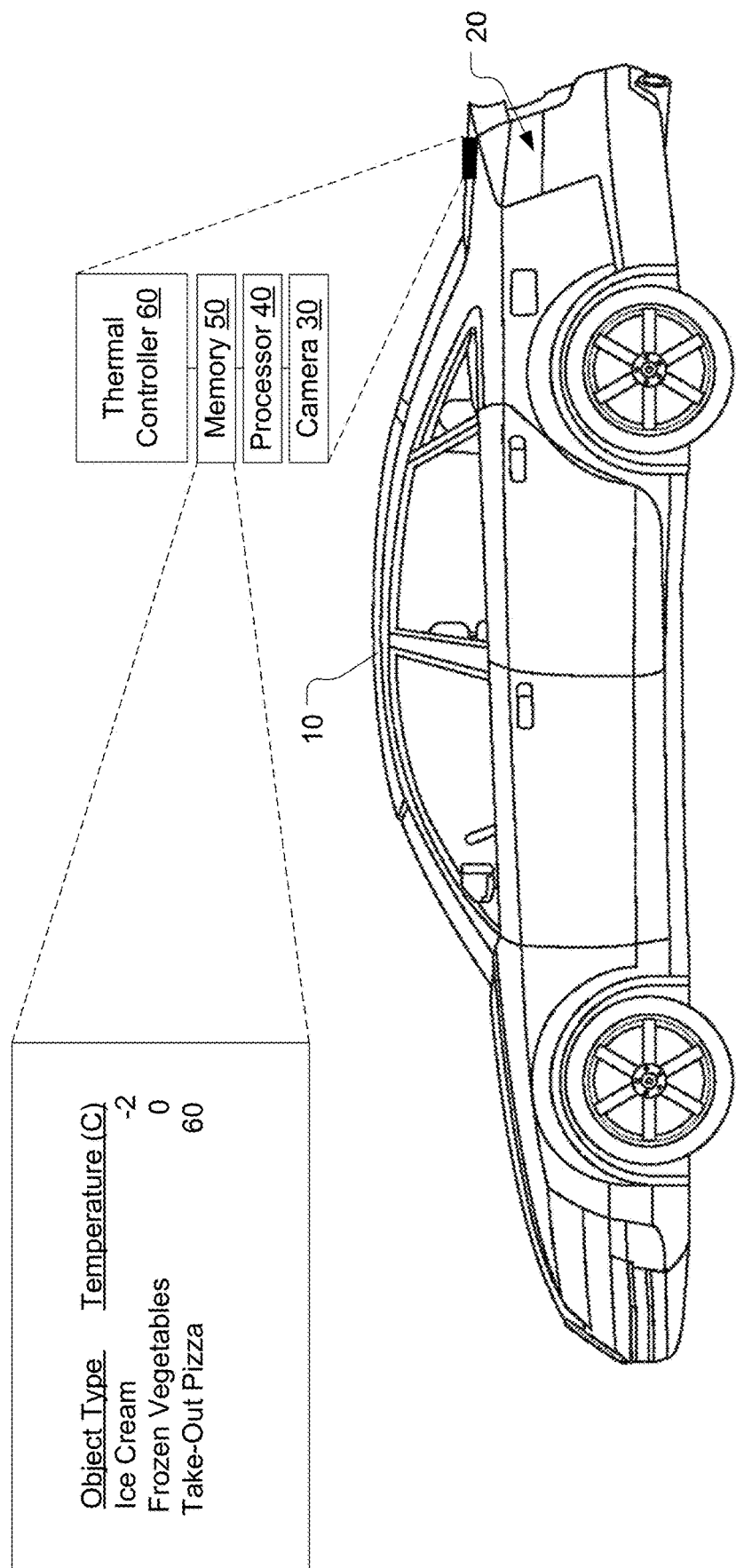
FIG. 5 is a left side view of the vehicle of FIG. 1.

As shown by way of example in FIG. 5, the memory 50 stores recommended temperatures, or temperature ranges, for storing different types of objects, e.g. different types of groceries. The temperatures may be set or modified/edited by the user. The temperatures may also be obtained by scanning a QR code or bar code of the object or product packaging to obtain from a website the recommended temperature for storage.

Figure 6:
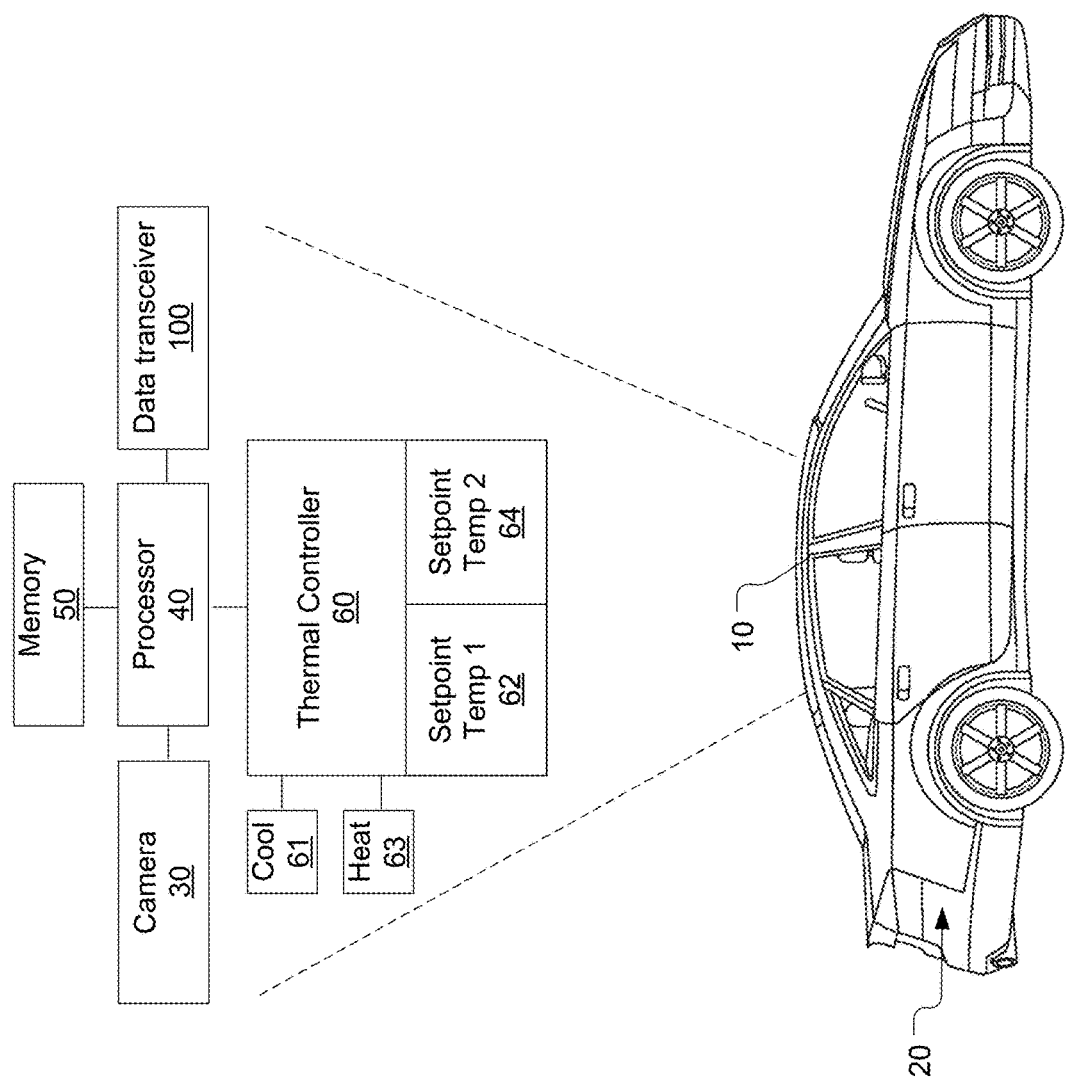
FIG. 6 depicts a vehicle having a divisible trunk and a thermal controller.

In the embodiment of FIG. 6, the vehicle 10 includes a thermal controller 60 to regulate the temperature in two separate trunk compartments of the trunk 20. As will be described in greater detail below, the thermal controller 60 is connected to, and controls, a cooling element (cooler) 61 and a heating element (heater) 63 which are able to selectively cool and/or heat the two separate compartments of the trunk to keep the first and second objects at different temperatures. As will be further described below, the thermal controller may set a first setpoint temperature 62 for a first compartment of the trunk and a second setpoint temperature 64 for a second compartment of the trunk. The thermal controller may a PID controller or any other suitable feedback control system.

Figure 7:
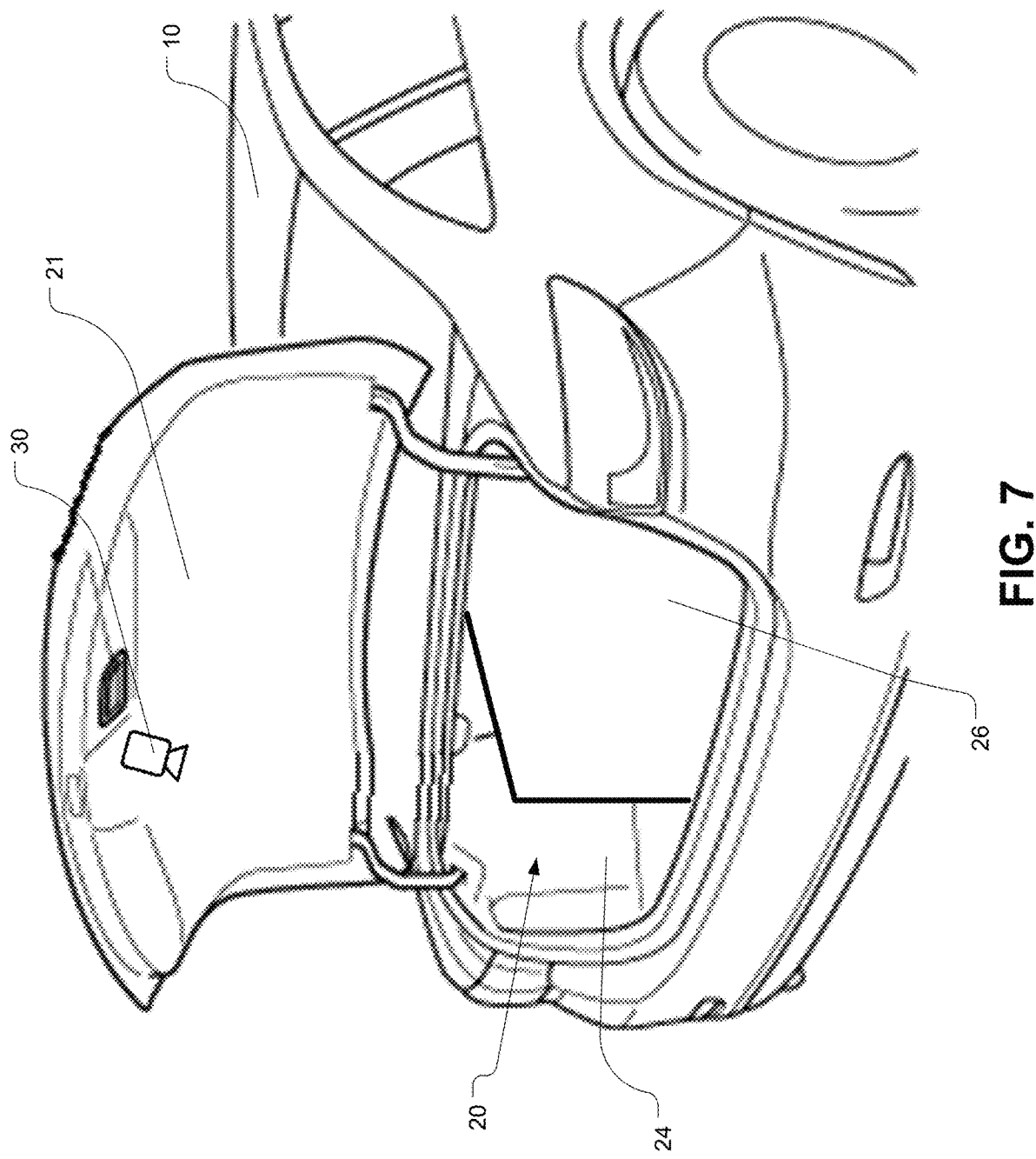
FIG. 7 is a perspective view of a divisible trunk that is divided by a trunk divider into a first trunk compartment and a second trunk compartment.

In the embodiment depicted in FIG. 7, the trunk 20 is a divisible trunk defining a divisible enclosure for storing a first object and a second object in separate compartments of the trunk 20. The camera 30 captures the first and second images of the first and second objects prior to being placed into separate compartments of the divisible trunk 20. The processor 40 communicatively connected to the camera 30 receives the first and second image data of the first and second images to enable recognition of the objects. The processor 40 executing the machine-vision module 42 processes the first and second image data to identify the first and second objects. The processor 40, camera 30 and module 42 together constitute a machine-vision system. The memory 50 coupled to the processor 40 may store recommended temperature settings for different types of objects. The processor 40 may thus look up in the memory 50 a recommended temperature setting for a particular object. The vehicle 10 includes a trunk divider 22 shaped and sized to divide the divisible trunk 20 into a first trunk compartment 24 and a second trunk compartment 26.

Figure 8:
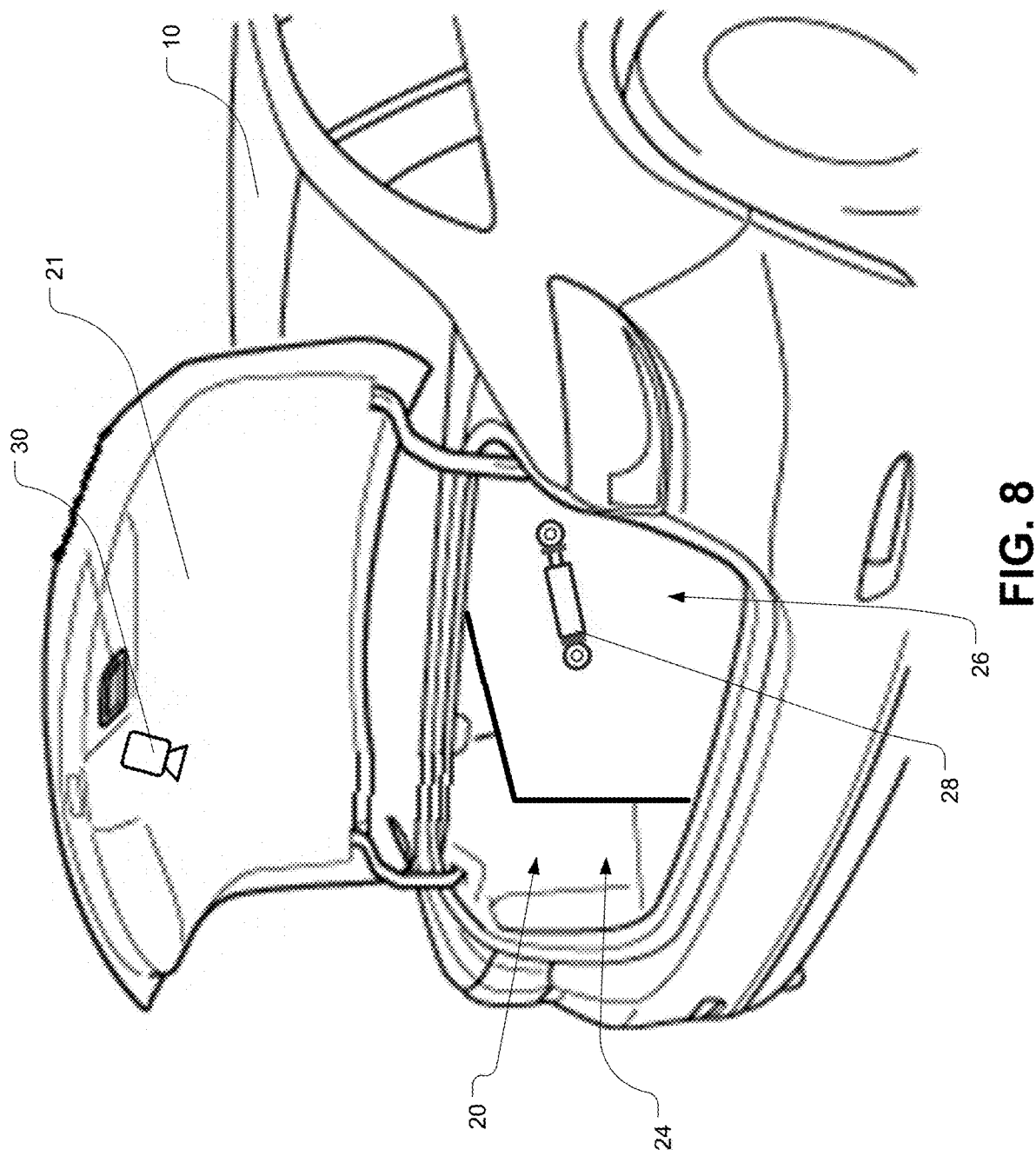
FIG. 8 is a perspective view of a divisible trunk that is divided by a trunk divider into a first trunk compartment and a second trunk compartment and further showing an actuator for moving the trunk divider.

As depicted by way of example in FIG. 8, the vehicle 10 includes an actuator 28 connected to the trunk divider 22 to displace the trunk divider 22 from an inoperative position in which the divisible trunk is undivided to an operative position in which the divisible trunk 20 is divided into the first and second trunk compartments 24, 26. The processor 40 is configured to generate and output a divider signal to the actuator 28 to cause the actuator 28 to displace the trunk divider 22 to divide the divisible trunk 20 into the first and second trunk compartments 24, 26. The actuator 28 may be a pneumatic actuator, hydraulic actuator, electric motor, or electric servo. In one embodiment, the trunk divider is manually movable (i.e. there is no actuator). A manually movable trunk divider may include a handle, finger grips, or like element to enable the user to manually displace the trunk divider. An automatically movable trunk divider may have a force-limiting slip mechanism to act as an anti-pinch mechanism to prevent pinching a finger during deployment. Alternatively, deployment may be limited to when the trunk is closed.

The trunk divider 22 may be a wall or rigid partition, articulated or segmented wall, inflatable barrier, or a curtain. The divider may be transparent or opaque or semi-opaque. The trunk divider 22 may slide on rails, grooves or guides disposed in the top surface and/or floor (bottom surface) of the trunk. The trunk divider 22 may move from a retracted (inoperative) position in which trunk is undivided to a deployed (operative) position in which the trunk 20 is divided into two trunk compartments, i.e. the first and second trunk compartments 24, 26. The trunk divider 22 may provide an airtight seal between the adjacent first and second compartments 24, 26 so that hot air from one compartment does not flow into the adjacent compartment being cooled. It will be appreciated that there may two or more trunk dividers 22 in other embodiments so as to divide the divisible trunk 20 into three or more trunk compartments.

The trunk divider 22 may be a thermally insulated partition to minimize heat transfer between the first and second trunk compartments 24, 26. The thermally insulated partition may include a double-walled structure with an air gap, vacuum or a partial vacuum between walls of the double-walled structure. In another embodiment, the trunk divider 22 is a partition that comprises a Peltier thermoelectric heat pump, i.e. a solid-state active heat pump which transfers heat from one side of the partition to the other by consuming electrical energy, depending on the direction of the electric current.

In the embodiment depicted in FIGS. 1-8, the processor 40 generates and outputs a thermal control signal to a thermal controller 60 to control a first temperature of the first trunk compartment 24 by setting a first setpoint temperature 62 for the first trunk compartment 24 and to control a second temperature of the second trunk compartment 26 by setting a second setpoint temperature 64 for the second trunk compartment 26. The thermal controller 60 may be connected to a heater (heating element) and a cooler (cooling element) to heat and cool the first and second trunk compartments. Alternatively, the thermal controller 60 may be connected to a hot air duct and a cold air duct to regulate a hot air supply and a cold air supply from a heat source and a cooling source. The thermal controller 60 may cool the first trunk compartment 24 while heating the second trunk compartment 26 or may heat the first trunk compartment 24 while cooling the second trunk compartment 26. The thermal controller 60 may heat both the first and second trunk compartments 24, 26 to different temperatures or may cool both the first and second trunk compartments 24, 26 to different temperatures. The thermal controller 60 may be connected to a climate control system of the vehicle (i.e. the main heating and cooling system of the vehicle for heating or cooling the cabin) or it may be a separate standalone system. The heating element may be for example an electric heater, a combustion-based heater, an infrared-emitting heater or other suitable heater. The cooling element may be an evaporative cooling system having a refrigerant. The cooling element may be an air conditioning unit having a compressor and heat exchange coil. The air conditioning unit may be a dedicated trunk air conditioner or it may the same air conditioner that cools the passenger of the cabin. The vehicle may include a heat pump in one implementation. The trunk 20 may include cooling and heating plates upon which the objects are placed to provide conductive heat transfer. The plates may be metal plates. The trunk 20 may include a Peltier thermoelectric heat pump, e.g. a Peltier heater and/or a Peltier cooler. The vehicle may scavenge heat from a heat source of the vehicle such as an internal combustion engine, electric motor or battery pack. In this embodiment, the vehicle may have a heat exchanger to draw heat from the heat source (e.g. battery pack) and a hot air duct to convey the hot air to the trunk compartment to be warmed. Similarly, a cool air duct may be provided between the passenger cabin and the trunk compartment to be cooled to share cool cabin air with that compartment. For example, if the cabin of the vehicle is being air conditioned to a sufficiently cool temperature and if the temperature required for the trunk compartment to be cooled is approximately the same, the cool air from the cabin may be shared with that particular trunk compartment via the cool air duct.

Figure 9:
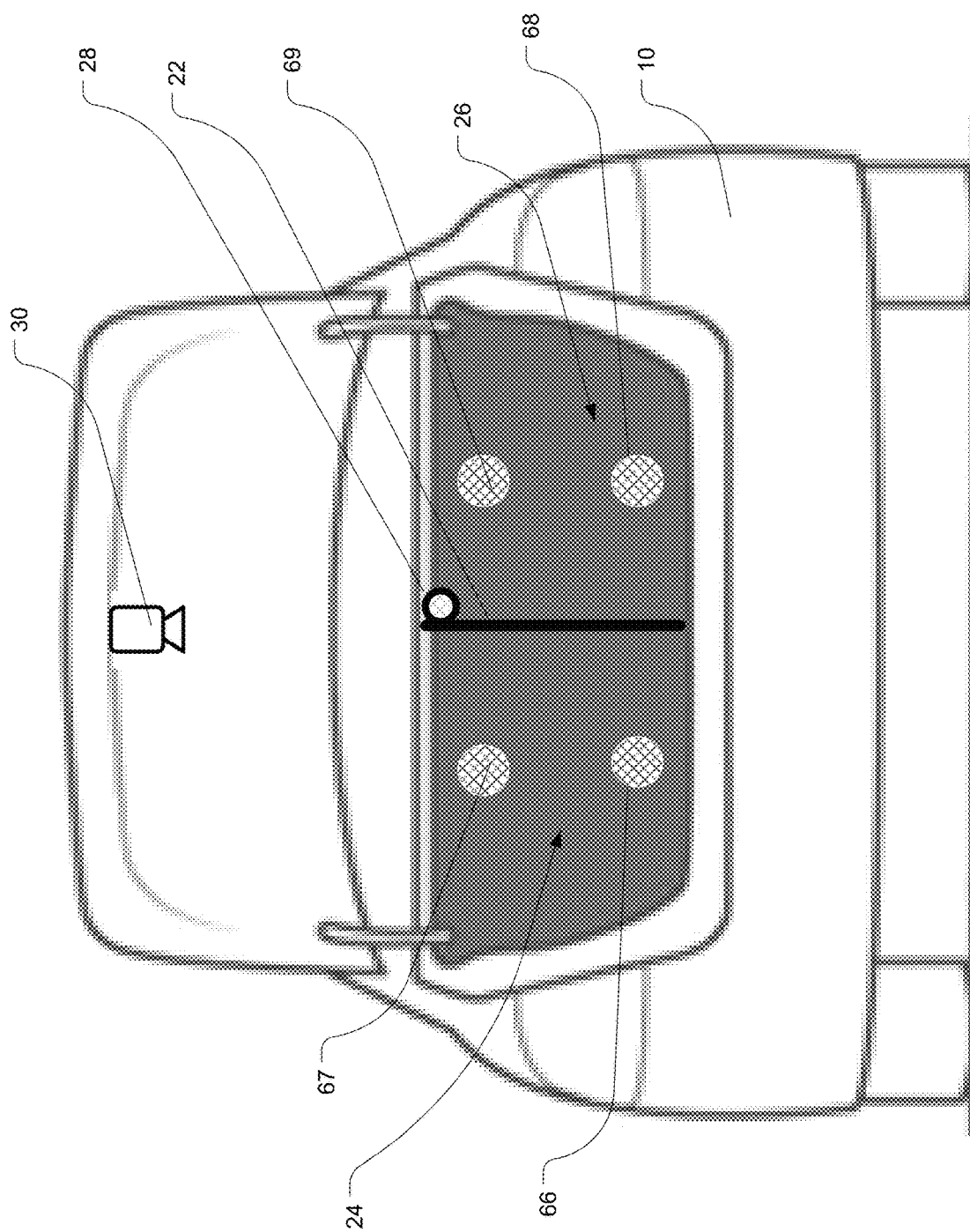
FIG. 9 is a rear view of a divisible trunk having hot and cold air inlets in both the first and second trunk compartments.

As depicted by way of example in FIG. 9, the first trunk compartment 24 may have a first hot air inlet 66 and the second trunk compartment 26 may have a second hot air inlet 68. The first trunk compartment may have a first cold air inlet 67 and the second trunk compartment 26 may have a second cold air inlet 69.

Figure 10:
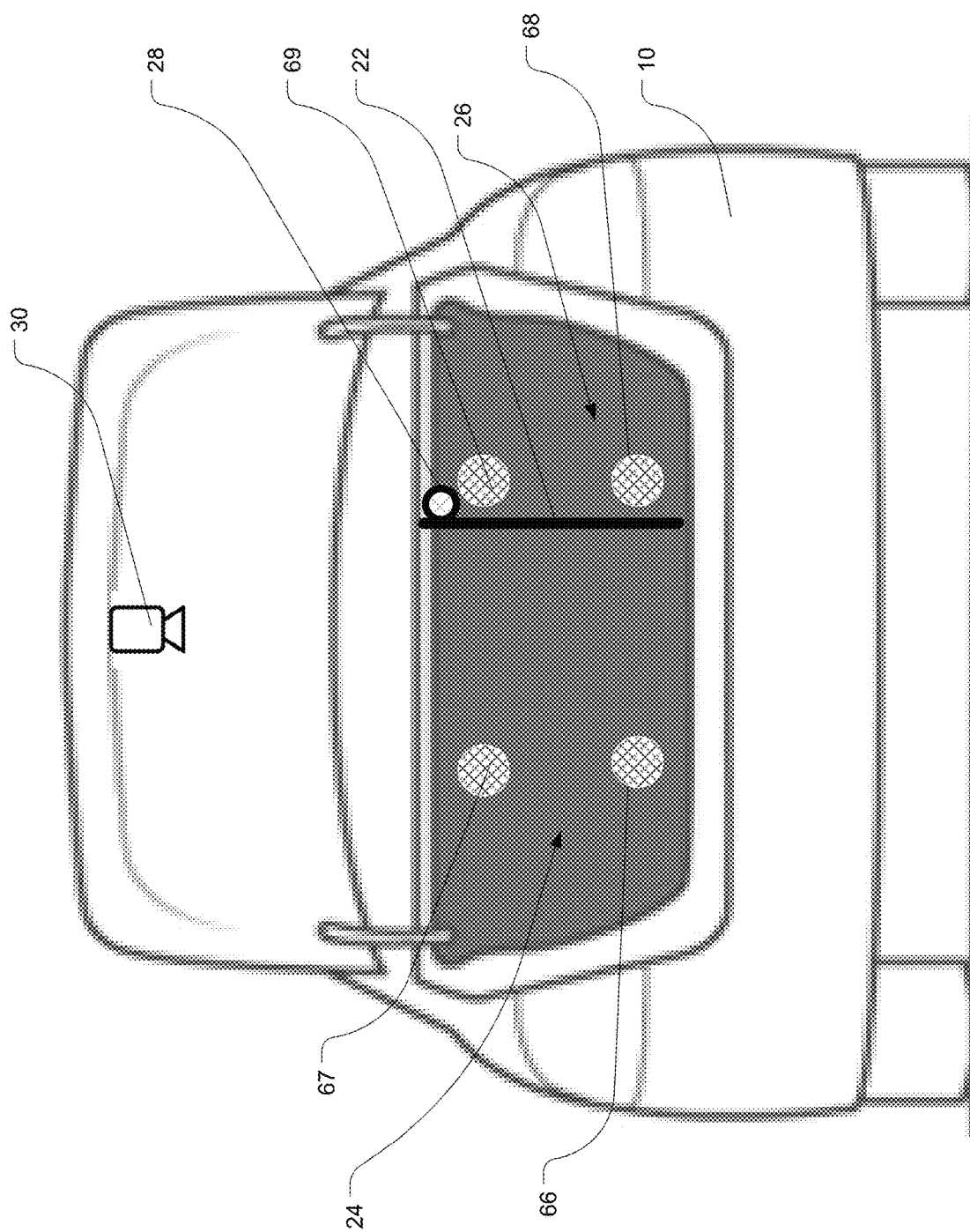
FIG. 10 is a rear view of a divisible trunk with the trunk divider asymmetrically disposed to asymmetrically divide the divisible trunk into a first trunk compartment that is larger than a second trunk compartment.

In the embodiment depicted in FIG. 10, the vehicle 10 has a divisible trunk 20 with the trunk divider 22 asymmetrically disposed to asymmetrically divide the divisible trunk 20 into a first trunk compartment 24 that is larger than a second trunk compartment 26.

Figure 11:
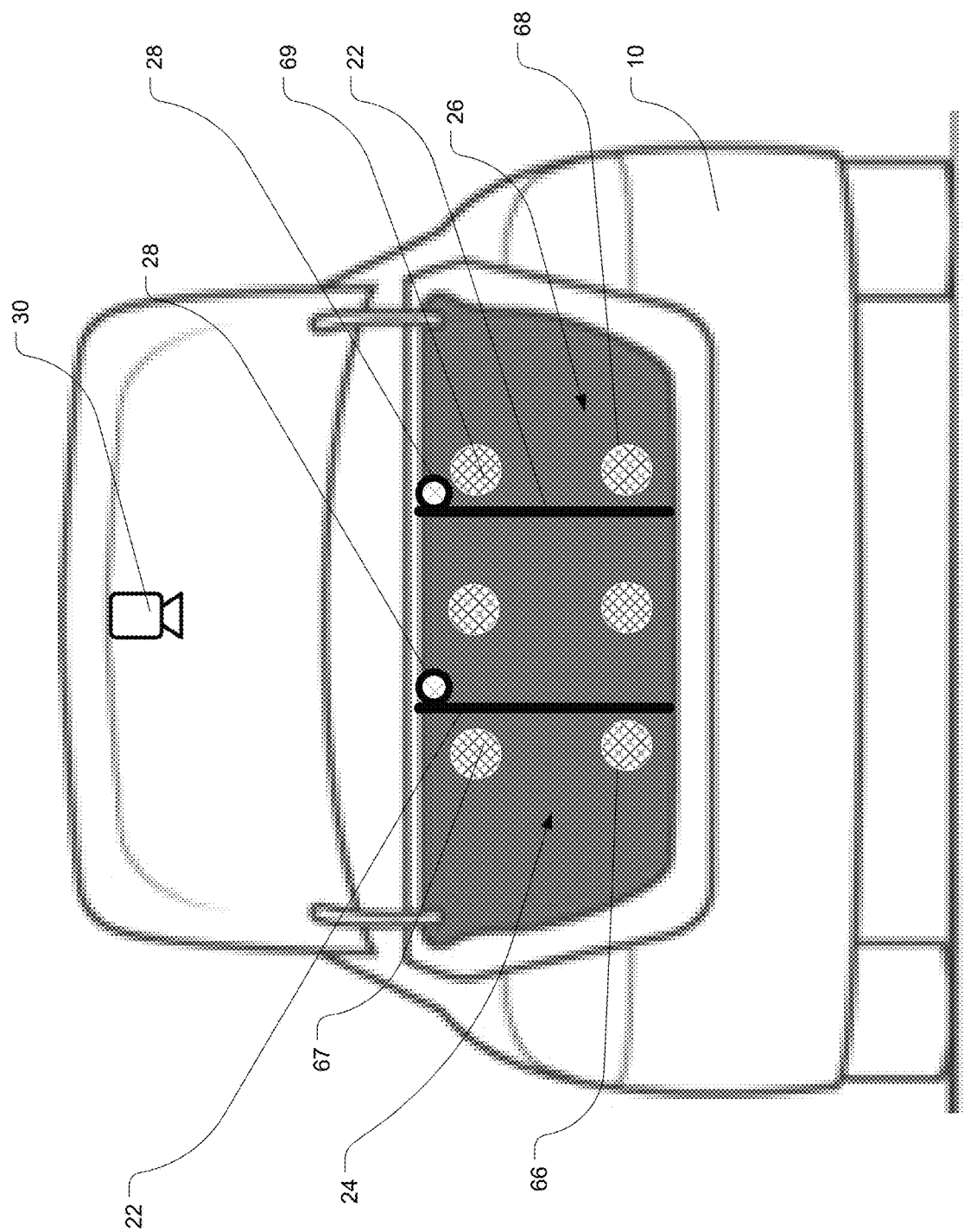
FIG. 11 is a rear view of a divisible trunk divided into three trunk compartments by two trunk dividers.

The trunk 20 of the vehicle 10 may optionally be divisible into more than two compartments. As depicted by way of example in FIG. 11, the vehicle has a divisible trunk 20 divided by a plurality of trunk dividers 22. In this figure, there are two trunk dividers 22 dividing the trunk 20 into three compartments. In this embodiment, each trunk divider is moved or displaced by a respective actuator 28.

Figure 12:
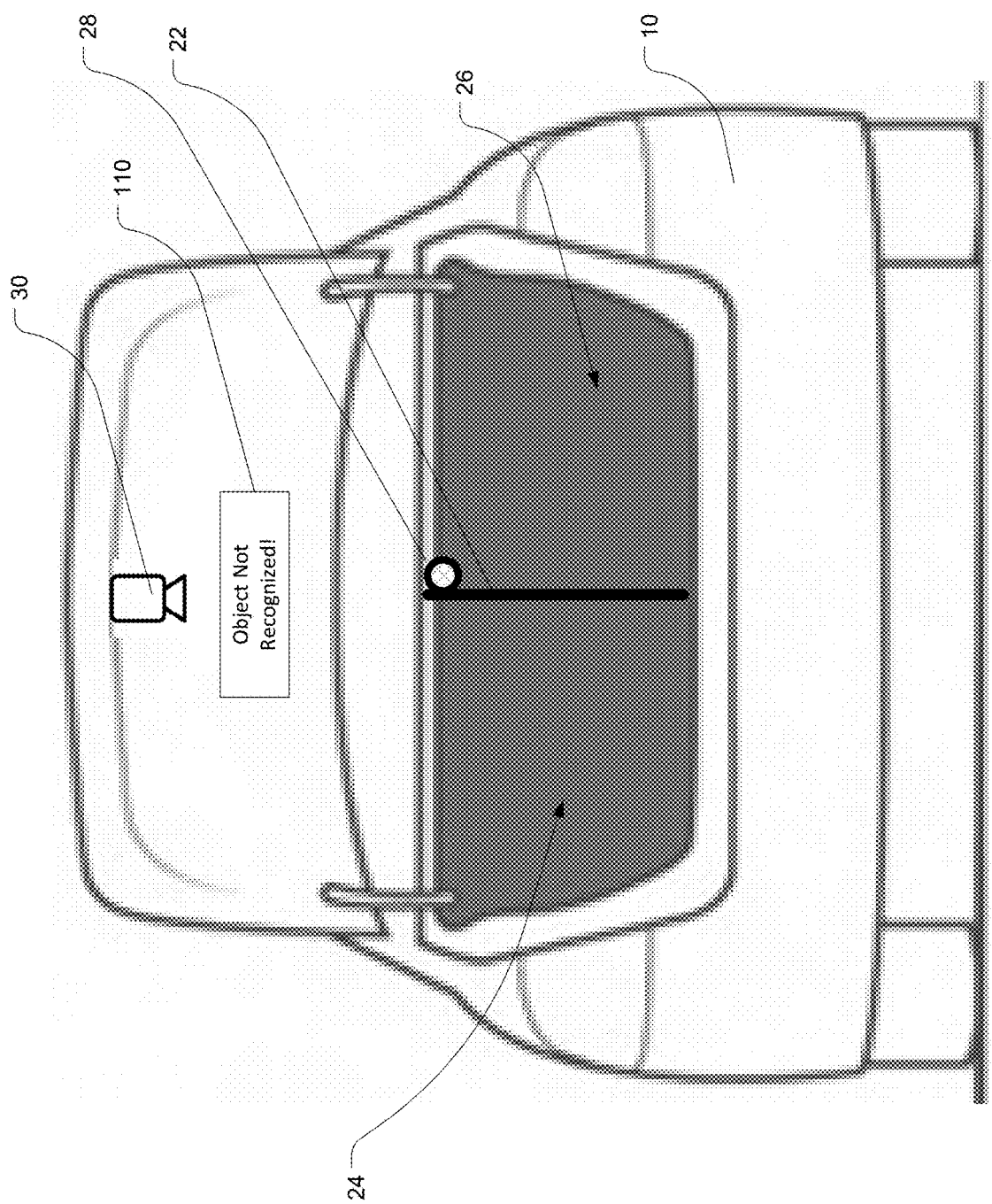
FIG. 12 is a rear view of a divisible trunk having a user interface notifying a user that the camera has not recognized the object to be placed into the trunk.

In the embodiment depicted in FIG. 12, the divisible trunk 20 has a user interface 110 (or "trunk user interface") for notifying a user that the camera 30 has not recognized the object to be placed into the trunk 20.

Figure 13:
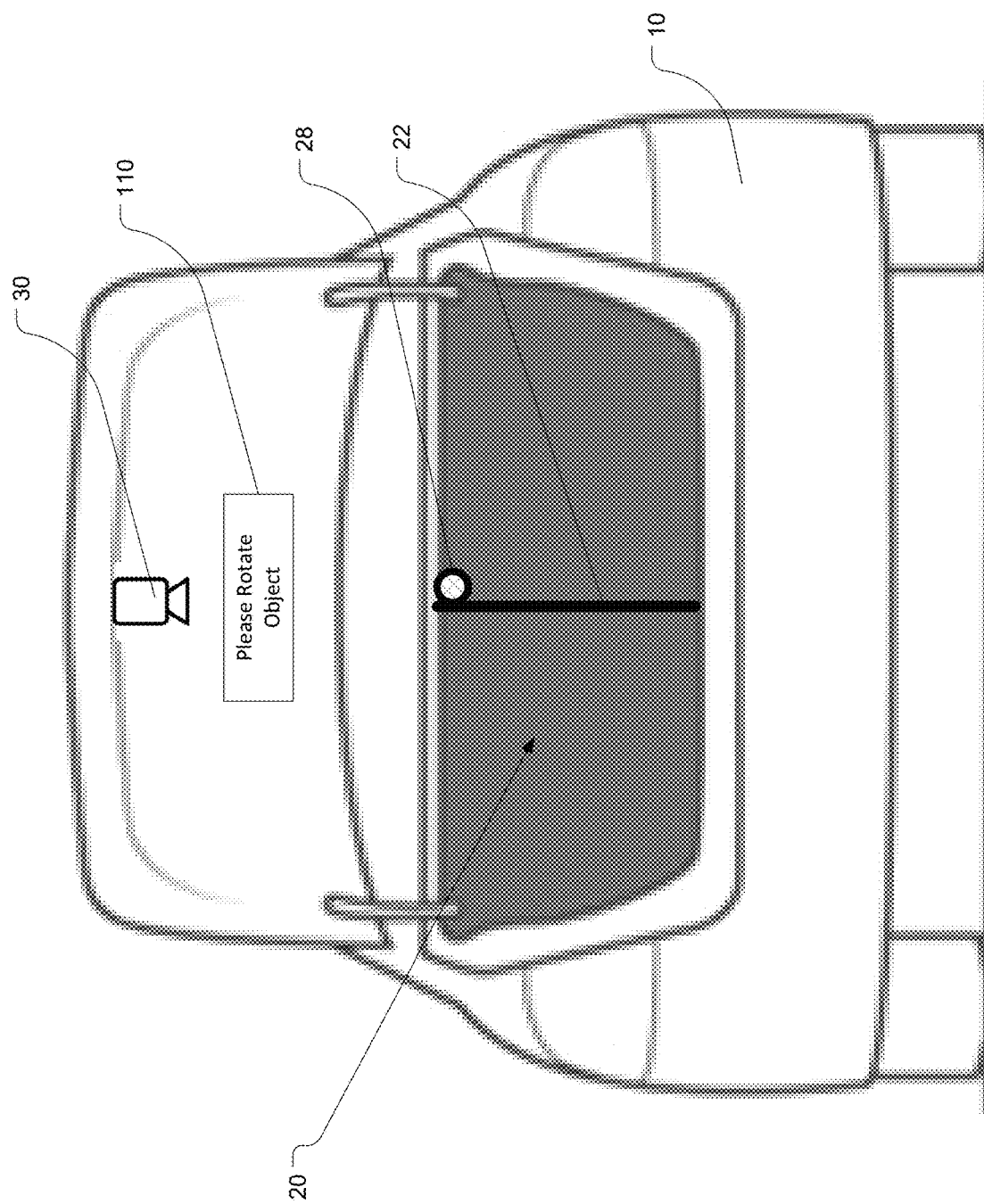
FIG. 13 is a rear view of a divisible trunk having a user interface requesting the user to rotate the object relative to the camera to enable the camera to capture another image of the object from a different perspective.

In the embodiment depicted in FIG. 13, the divisible trunk 20 has a user interface 110 requesting the user to rotate the object relative to the camera 30 to enable the camera 30 to capture another image of the object from a different perspective. In other words, the user interface 110 may be configured to visually or audibly inform the user holding the first object to be placed in the divisible trunk 20 that the first object has not been identified and providing instructions to the user to rotate the first object relative to the camera 30 to enable an additional image of the first object to be captured by the camera 30.

Figure 14:
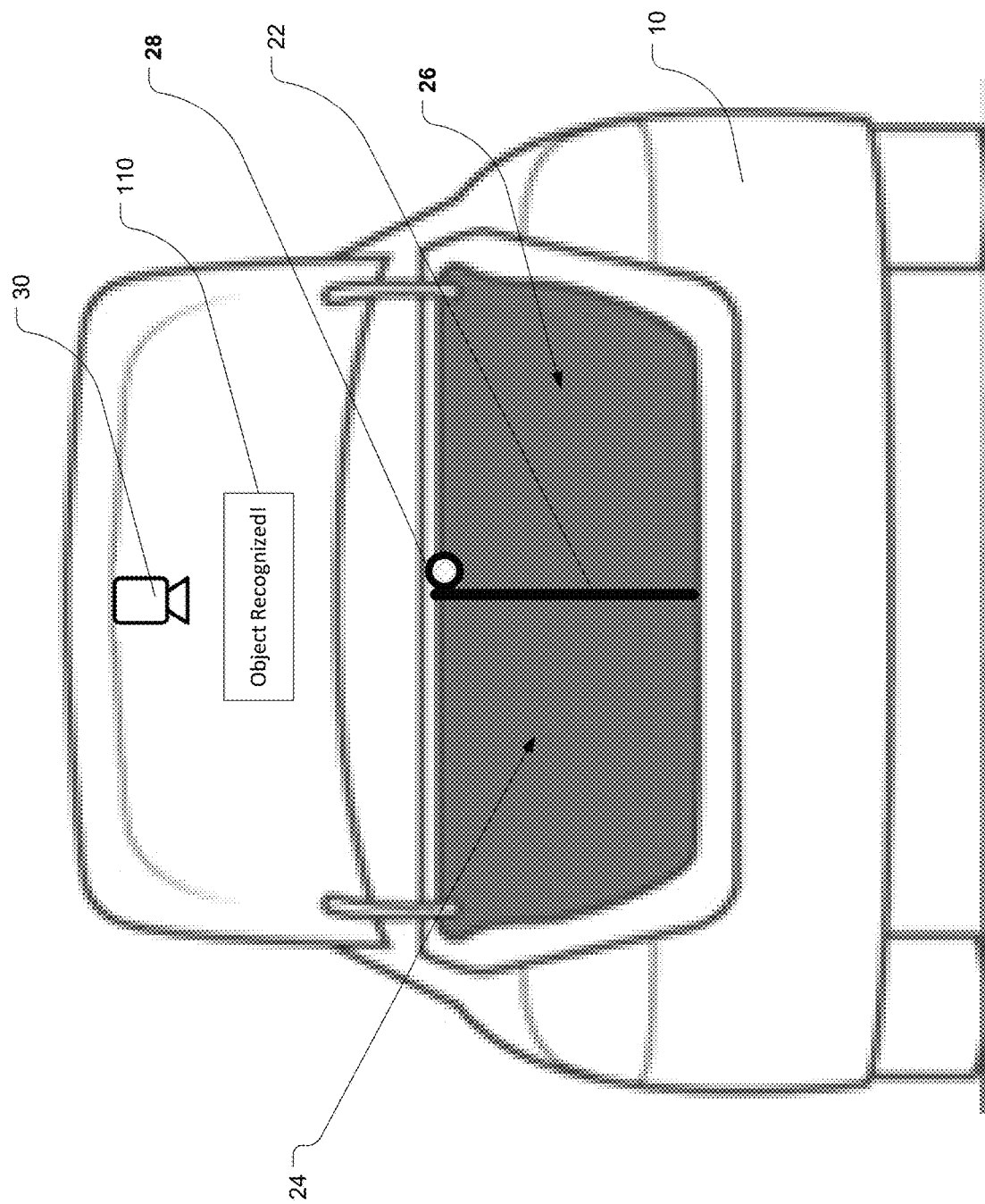
FIG. 14 is a rear view of a divisible trunk having a user interface notifying a user that the camera has recognized the object to be placed into the trunk.

In the embodiment depicted in FIG. 14, the divisible trunk 20 has a user interface 110 notifying a user that the camera 30 has recognized the object to be placed into the trunk 20. In other words, the user interface 110 may be configured to notify a user holding the first object to be placed in the divisible trunk 20 that the first object has been identified by the machine-vision module 42 (or other object recognition module).

In one embodiment, the user interface 110 may notify the user that the first object has not been identified and prompting the user to speak the name of the first object, wherein the processor 40 is configured to recognize using a speech-recognition module 44 the name of the first object spoken by the user and to output a confirmation that the name of the first object has been recognized by the processor 40.

In some embodiments, the vehicle 10 comprises a user interface 110 to indicate to a user loading the trunk 20 which of the first and second trunk compartments 24, 26 corresponds to the first and second objects so that the correct objet is placed in its thermally appropriate compartment.

Figure 15:
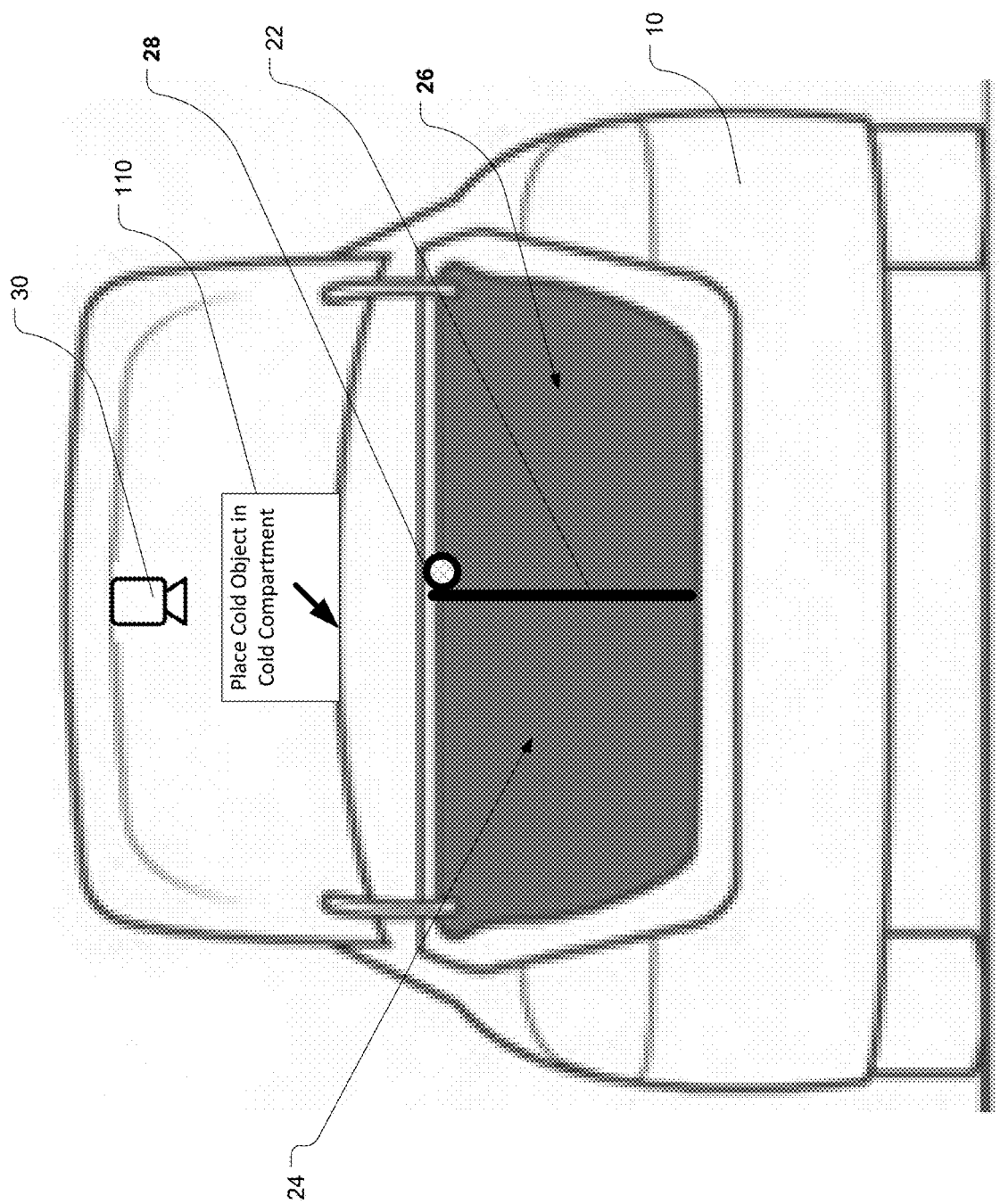
FIG. 15 is a rear view of a divisible trunk having a user interface instructing a user to place the first (cold) object into the first (cold) trunk compartment.

In the embodiment depicted in FIG. 15, the divisible trunk 20 has a user interface 110 instructing a user to place the first (cold) object into the first (cold) trunk compartment 24. Optionally, the user interface 110 may display an arrow or other visual indicator to indicate which trunk compartment to place the first object. In one embodiment, the visual indicator may be a blue light, e.g. a blue LED light or set of lights, that illuminates the first compartment in blue lighting to signify that the first compartment is the cool compartment. In one variant, the blue light may blink in response to detecting that the object requires cooling to signify to the user to place the object in the cool compartment.

Figure 16:
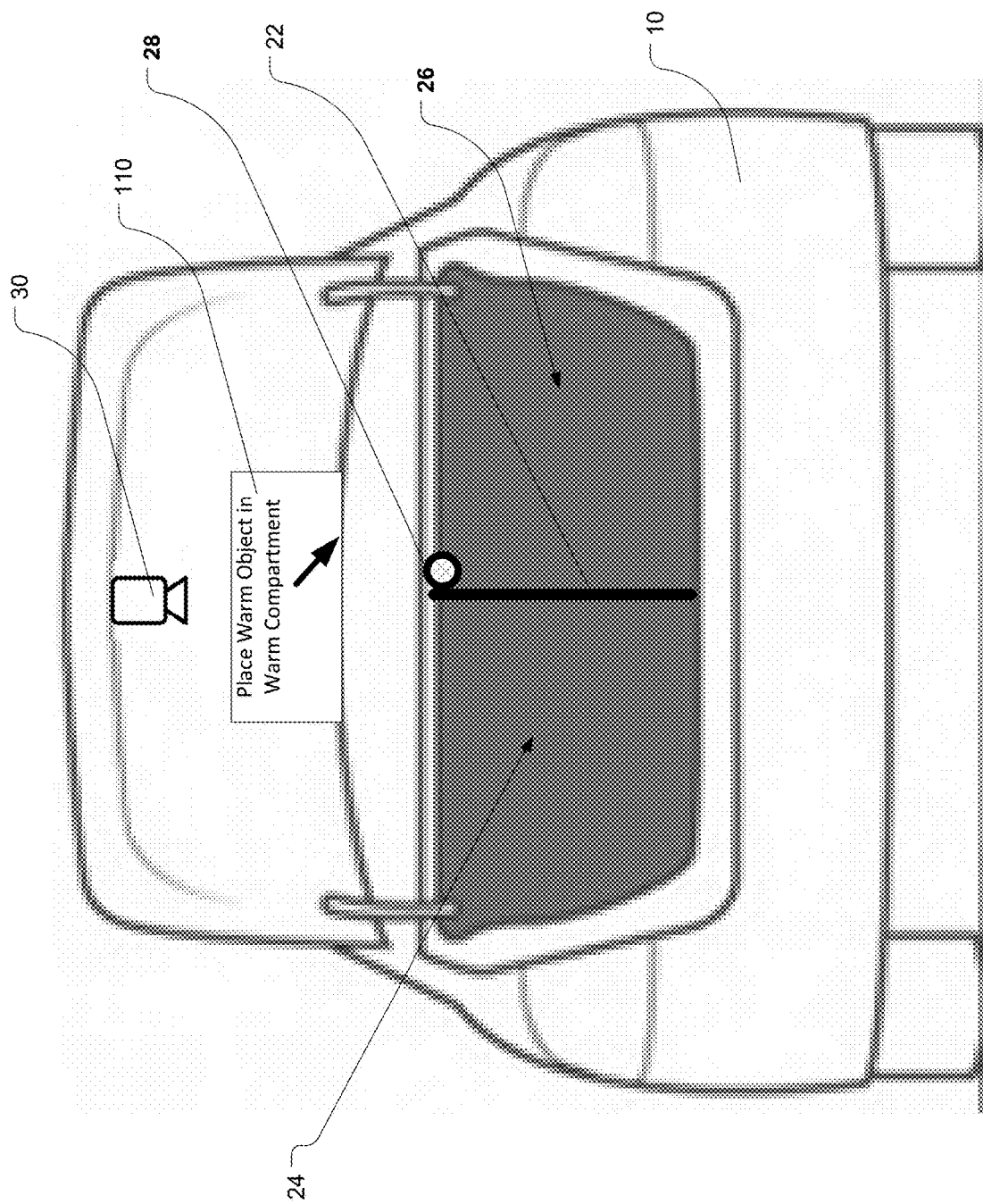
FIG. 16 is a rear view of a divisible trunk having a user interface instructing a user to place the second (warm) object into the second (warm) trunk compartment.

In the embodiment depicted in FIG. 16, the divisible trunk 20 has a user interface 110 instructing a user to place the second (warm) object into the second (warm) trunk compartment 26. Optionally, the user interface 110 may display an arrow or other visual indicator to indicate which trunk compartment to place the first object. In one embodiment, the visual indicator may be a red light, e.g. a red LED light or set of lights, that illuminates the first compartment in red lighting to signify that the first compartment is the warm compartment. In one variant, the red light may blink in response to detecting that the object requires heating to signify to the user to place the object in the warm compartment.

Optionally, the divisible trunk 20 has both blue and red lights to respectively illuminate the first and second compartments simultaneously to signify that the first and second compartments are the cool and warm compartments, respectively. In a variant the lighting is activated only in low-light conditions such as at night.

In one embodiment, the user interface 110 outputs an alert to the user if the first object is placed erroneously in the second trunk compartment 26 or if the second object is erroneously placed in the first trunk compartment 24.

Figure 17:
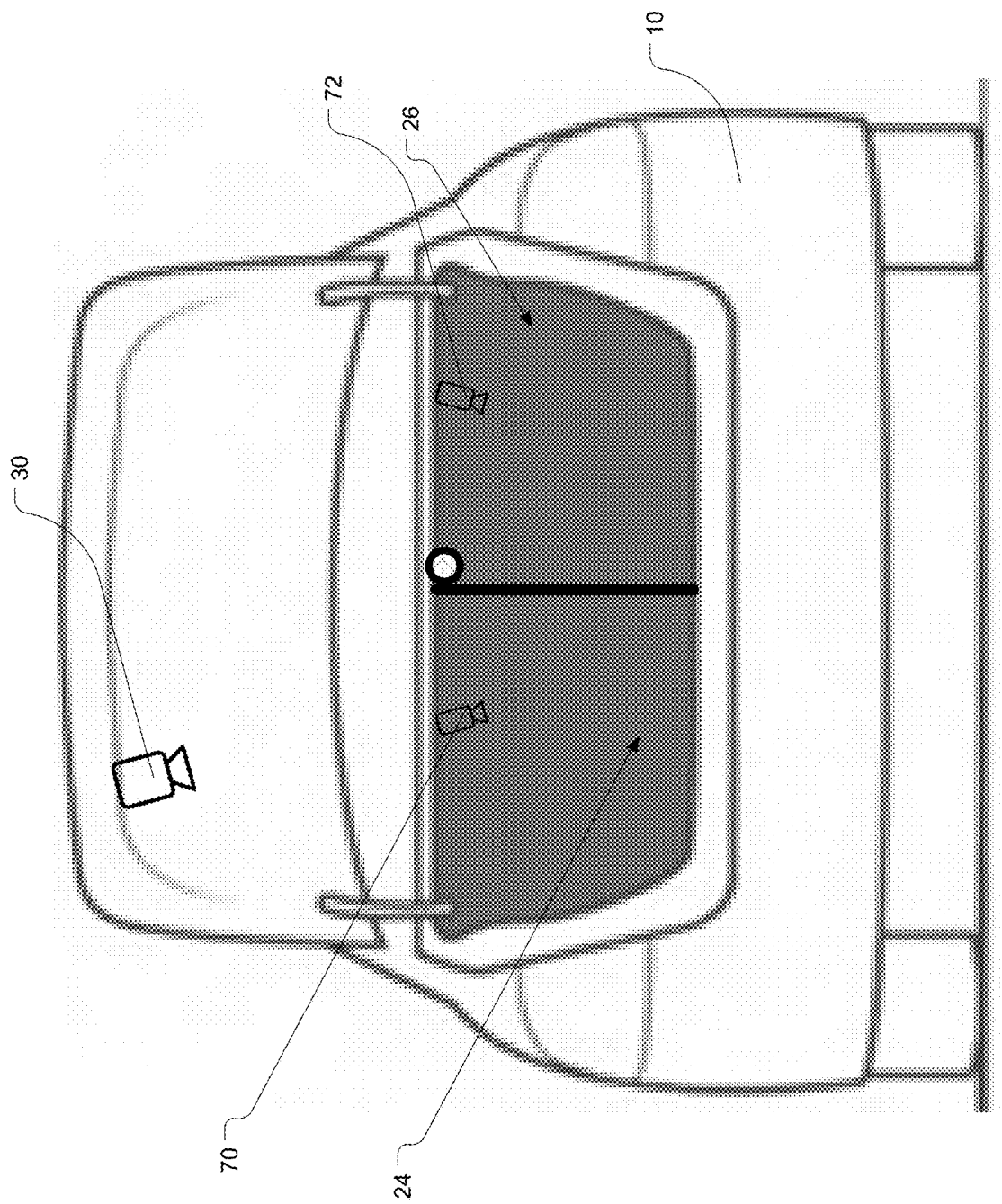
FIG. 17 is a rear view of a divisible trunk depicting first and second thermal imagers in the first and second trunk compartments.

In the embodiment depicted in FIG. 17, the vehicle 10 comprises a first thermal imager 70 disposed in the first trunk compartment 24 to sense a first object temperature and a second thermal imager 72 disposed in the second trunk compartment 26 to sense a second object temperature. The thermal controller 60 receives feedback signals from the first and second thermal imagers 70, 72 to automatically increase or decrease heating and/or cooling to the first and second trunk compartments 24, 26 based on the feedback signals.

Figure 18:
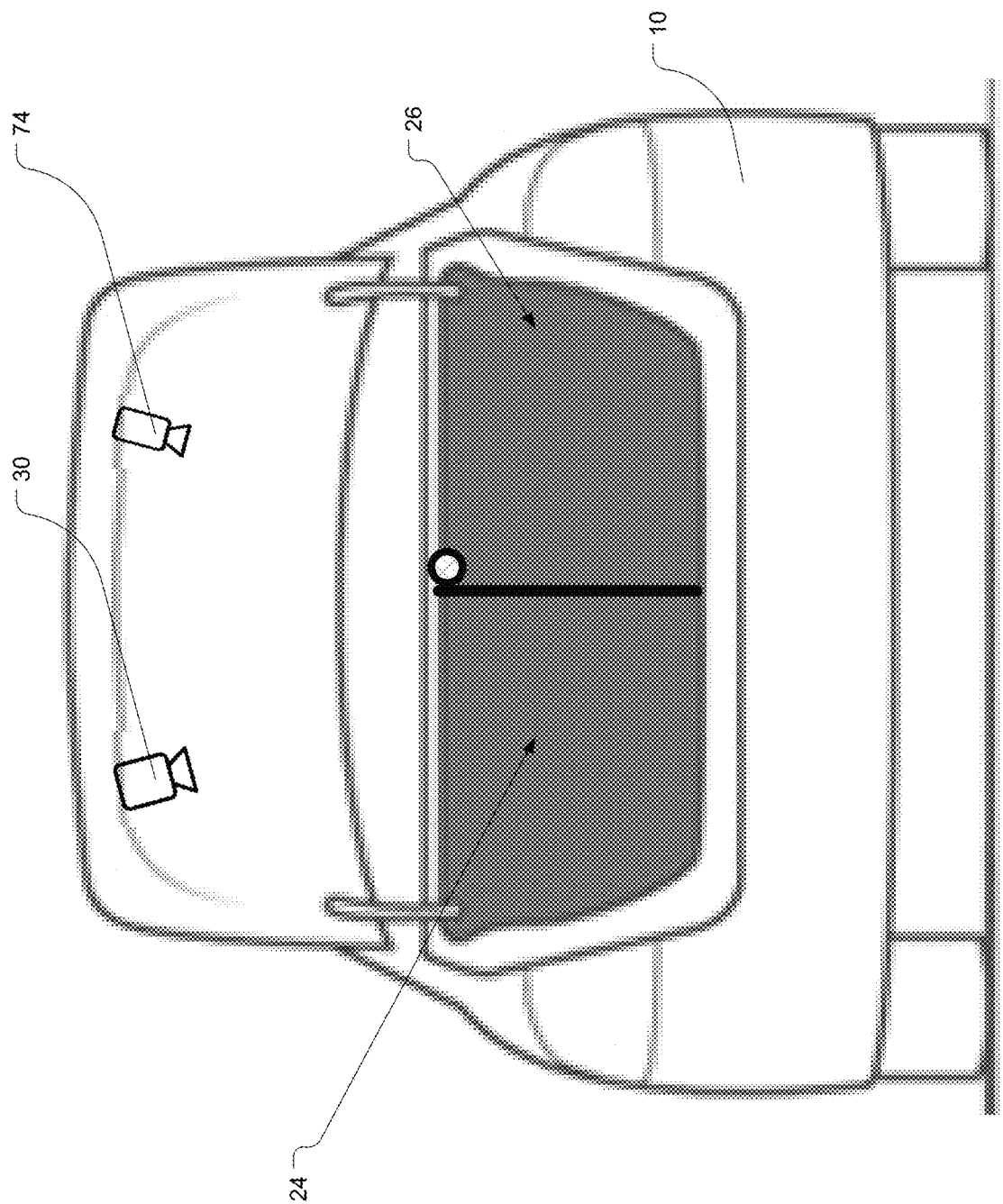
FIG. 18 is a rear view of a divisible trunk depicting a lid-mounted thermal imager.

In the embodiment depicted in FIG. 18, the vehicle 10 comprises a single lid-mounted thermal imager 74 to generate thermal image data of the first and second objects, from which current temperatures of the first and second objects are determined, wherein the processor 40 uses the current temperatures of the first and second objects to set the first and second setpoint temperatures 62, 64 for the first and second trunk compartments 24, 26.

In one embodiment, the vehicle 10 comprises a plurality of trunk dividers 22, a plurality of actuators 28 connected to the trunk dividers 22 and a user interface 110 to receive user input specifying how many trunk compartments 24, 26 to provide, wherein the processor 40 processes the user input from the user interface 110 and causes the plurality of actuators 28 to displace the trunk dividers 22 to divide the divisible trunk 20 into a plurality of trunk compartments 24, 26. The user interface 110 is also configured to receive the setpoint temperatures as user input for each of the trunk compartments 24, 26.

The vehicle 10 may be an autonomous vehicle with a self-driving capability. In addition to its self-driving capability, the autonomous vehicle may be able to autonomously divide the trunk 20 and regulate the temperatures inside the trunk compartments 24, 26 based on machine-vision identification of objects loaded into the trunk compartments 24, 26 or based on other data received by the vehicle.

Figure 19:
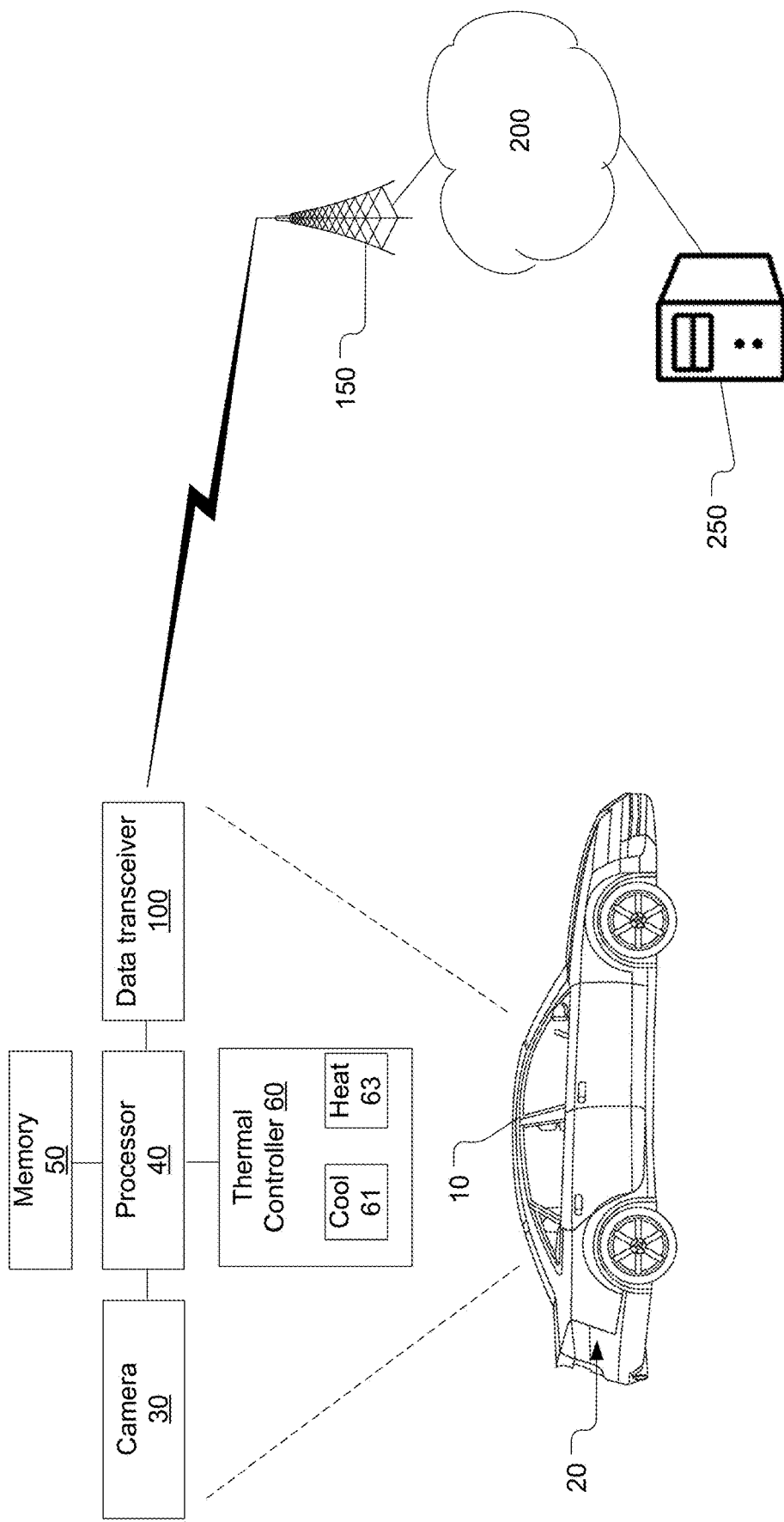
FIG. 19 depicts a vehicle communicating with a server to obtain object identification data.

In the embodiment depicted in FIG. 19, the vehicle 10 comprises a radiofrequency (RF) transceiver 100 for receiving object identification data identifying the first and second objects to be picked up by the vehicle operating autonomously. The RF transceiver 100 communicates via a base transceiver station (cell tower) 150 and the internet 200 with a server 250 to receive the object identification data. For example, the object identification data may be data identifying groceries to be picked up. For example, the autonomous vehicle may be sent on an errand to pick up ice cream from a supermarket and then to pick up take-out pizza from a pizzeria. The processor 40 of the autonomous vehicle 10 may thus compartmentalize the trunk 20 (i.e. divide the trunk 20 into separate compartments) and begins to cool one compartment in anticipation of receiving the ice cream while heating the other compartment in anticipation of receiving the pizza. In this embodiment, the processor 40 is communicatively coupled to the radiofrequency transceiver 100 to pre-emptively actuate the trunk divider 22 to divide the divisible trunk 20 into the first and second compartments 24, 26 and to send the thermal control signal to the thermal controller 60 to pre-emptively set the first and second setpoint temperatures for the first and second trunk compartments 24, 26. The first setpoint temperature 62 may be, for example, set at −2 degrees Celsius (i.e. 28 degrees Fahrenheit) to receive the ice cream in the first trunk compartment 24 while the second setpoint temperature 64 may be set, for example, to 60 degrees Celsius (i.e. 140 degrees Fahrenheit) to keep the pizza warm in the second trunk compartment 26. The recommended temperatures may be obtained from the memory 50 as described above. In the example above, the vehicle 10 receives a user instruction or user command (sending it on errand). The user command may include a destination such as a store, restaurant, drive-through fast-food outlet, or a friend's house. The user command may specify the object(s) to be collected i.e. received in the trunk. In response to the user command, the vehicle 10 determines whether cooling or heating is required to transport the object(s). If the vehicle determines that cooling and/or heating is required for the object(s), the vehicle automatically divides the trunk and then automatically activates a thermal controller to cool and/or heat the trunk compartments. Optionally, the vehicle has a machine-vision system to validate the object(s) being placed in the trunk compartments to ensure that an objects requiring cooling are cooled and/or objects requiring warmth are heated. Optionally, the machine-vision system may recognize when an object is removed from the trunk, shutting off the cooling or heating when it is no longer required in order to save energy.

In some embodiments, the vehicle 10 divides the trunk and initiates cooling and/or heating before arriving at a destination where the objects are to be received. For example, while driving to a supermarket to pick up groceries, the vehicle may use the object identification data to configure (divide) the trunk and initiate thermal control (cooling or heating) based on recommended temperatures.

In one embodiment, the processor 40 causes the actuator 28 to displace the trunk divider 22 to pre-emptively divide the divisible trunk 20 and to cause the thermal controller 60 to pre-emptively set the first and second setpoint temperatures at a computed time prior to the vehicle autonomously opening the trunk 20. The computed time is determined using a rate of cooling or heating of a heating or cooling element controlled by the thermal controller 60, a current trunk temperature and a current outside temperature.

In one embodiment, the processor 40 causes the actuator 28 to displace the trunk divider 22 to pre-emptively divide the divisible trunk 20 and to cause the thermal controller 60 to pre-emptively set the first and second setpoint temperatures 62, 64 a computed time prior to the vehicle autonomously arriving at a destination where the first and second objects 24, 26 are to be received into the trunk 20. As noted above, the computed time is determined using a rate of cooling or heating of a heating or cooling element controlled by the thermal controller 60, a current trunk temperature and a current outside temperature.

Figure 20:
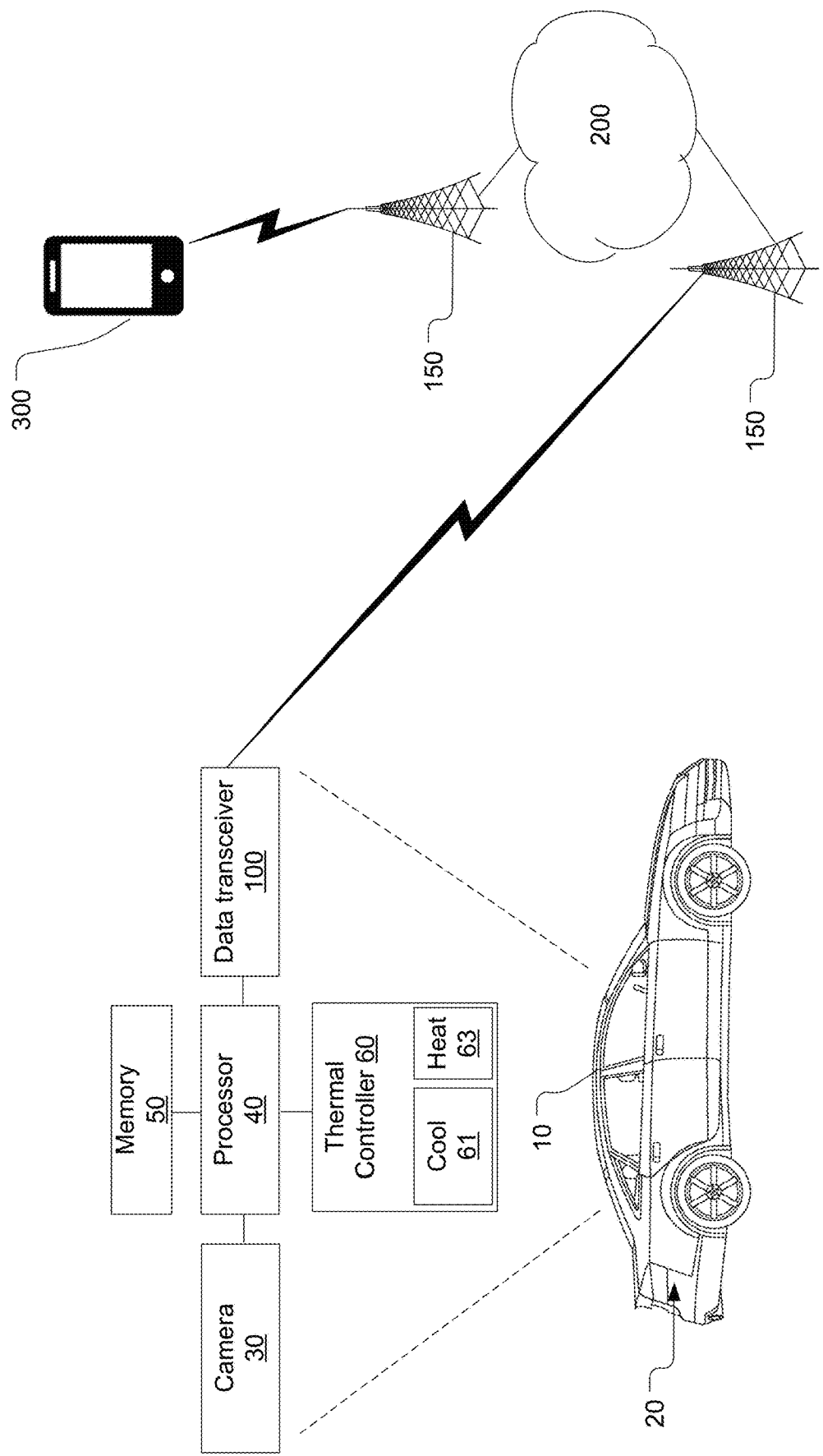
FIG. 20 depicts a vehicle communicating with a mobile communication device.

In the embodiment depicted in FIG. 20, an unoccupied autonomous vehicle 10 communicates with a mobile communication device 300 associated with the owner/operator/user of the vehicle 10. In one embodiment, the processor 40 determines that there is insufficient battery charge for the vehicle operating autonomously to provide a minimal amount of cooling or heating required for the first or second object to be delivered to a home destination. The processor 40, in response to determining that there is insufficient battery charge, causes the radiofrequency transceiver 100 to transmit notification data via the base transceiver station 150 and internet 200 to the mobile communication device 300 to cause the mobile communication device 300 to process the notification data to display a notification that there is insufficient battery charge to deliver the first or second object to the home destination, wherein the notification includes a prompt to cancel an order for the first or second object.

In one embodiment, the processor 40 is configured to determine that the vehicle 10 is driving autonomously without any occupants in the cabin and, in response to determining that the vehicle 10 has no occupants in the cabin, to deactivate a climate control system for the cabin to divert energy to thermal control of the first and second trunk compartments 24, 26.

In one embodiment, the processor 40 is configured to receive a travel time to a home destination associated with the vehicle 10, weather data, and a battery state of the vehicle 10 from which the processor 40 is configured to generate and output the thermal control signal to the thermal controller 60.

In one embodiment, the processor 40 is configured to receive a trunk-opening signal indicating that the trunk 20 is being opened, wherein the processor 40 is configured to cause the actuator 28 to retract the trunk divider 22 in response to receiving the trunk-opening signal and to send a deactivation signal to the thermal controller 60 to cease thermal control of the first and second trunk compartments 24, 26.

Another aspect of the disclosure is a vehicle 10 that includes a trunk 20 defining an enclosure for storing an object, and a camera 30 to capture an image of the object prior to being placed into the trunk, the camera 30 generating image data of the image. The vehicle 10 includes a processor 40 communicatively connected to the camera 30 to receive the image data of the image, wherein the processor 20 executes a machine-vision module 42 to process the image data to identify the object. The processor 40 generates and outputs a thermal control signal to a thermal controller 60 to control a temperature of the trunk 20 by setting a setpoint temperature for the trunk 20. In this aspect, the vehicle 10 has a single undivided trunk 20 for receiving an object and for controlling the temperature of the trunk 20 based on machine recognition of the object to be placed into the trunk 20.

Another aspect of the disclosure is a vehicle 10 that includes a divisible trunk 20 defining an enclosure for storing a first object and a second object. The vehicle 10 also includes a trunk divider 22 shaped and sized to divide the divisible trunk 22 into a first trunk compartment 24 and a second trunk compartment 26. The vehicle further includes an actuator 28 connected to the trunk divider 22 to displace the trunk divider 22 from an inoperative position in which the divisible trunk 22 is undivided to an operative position in which the divisible trunk 22 is divided into the first and second trunk compartments 24, 26. The processor 40 is configured to generate and output a divider signal to the actuator 28 to cause the actuator 28 to displace the trunk divider 22 to divide the divisible trunk 20 into the first and second trunk compartments 24, 26. In this aspect, the vehicle 10 has a divisible trunk 20 to divide the trunk 20 into two compartments but does not cool or heat the trunk compartments.

Figure 21:
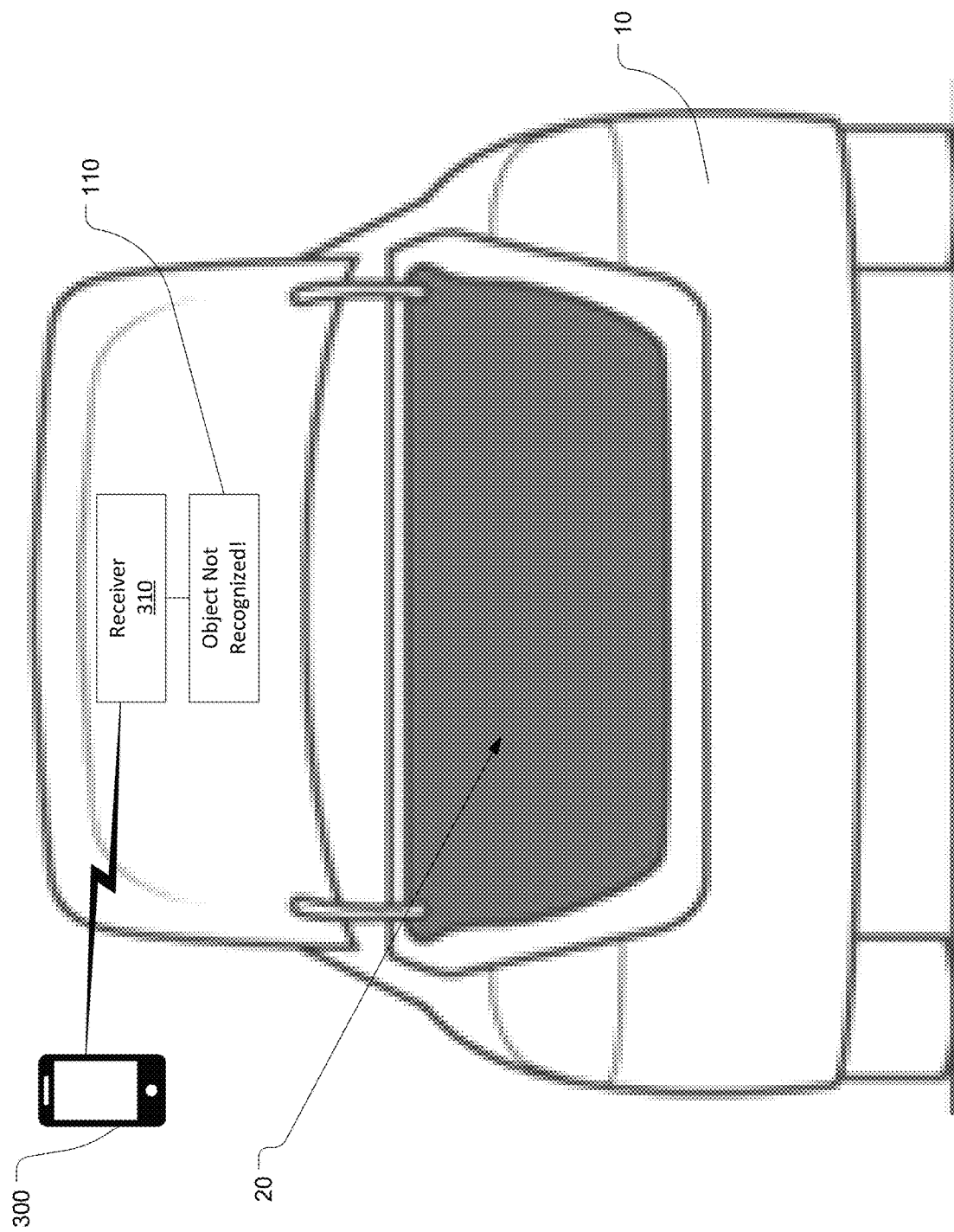
FIG. 21 depicts a mobile communication device capturing an image of an object and transmitting the image data to a receiver of a vehicle to enable recognition of the object to be loaded into the trunk of the vehicle.

In the embodiment of FIG. 21, a mobile communication device 300 having its on onboard camera is used to capture the image data of the object to be loaded into trunk 20. The mobile communication device 300 may communicate image data to a receiver 310 in the vehicle. The receiver 310 provides the image data to the processor 40 to enable machine-vision recognition of the object photographed using the camera of the mobile communication device 300. The user interface 110 on the vehicle or the mobile device communication 300 may notify the user whether the object has been recognized or not.

Figure 22:
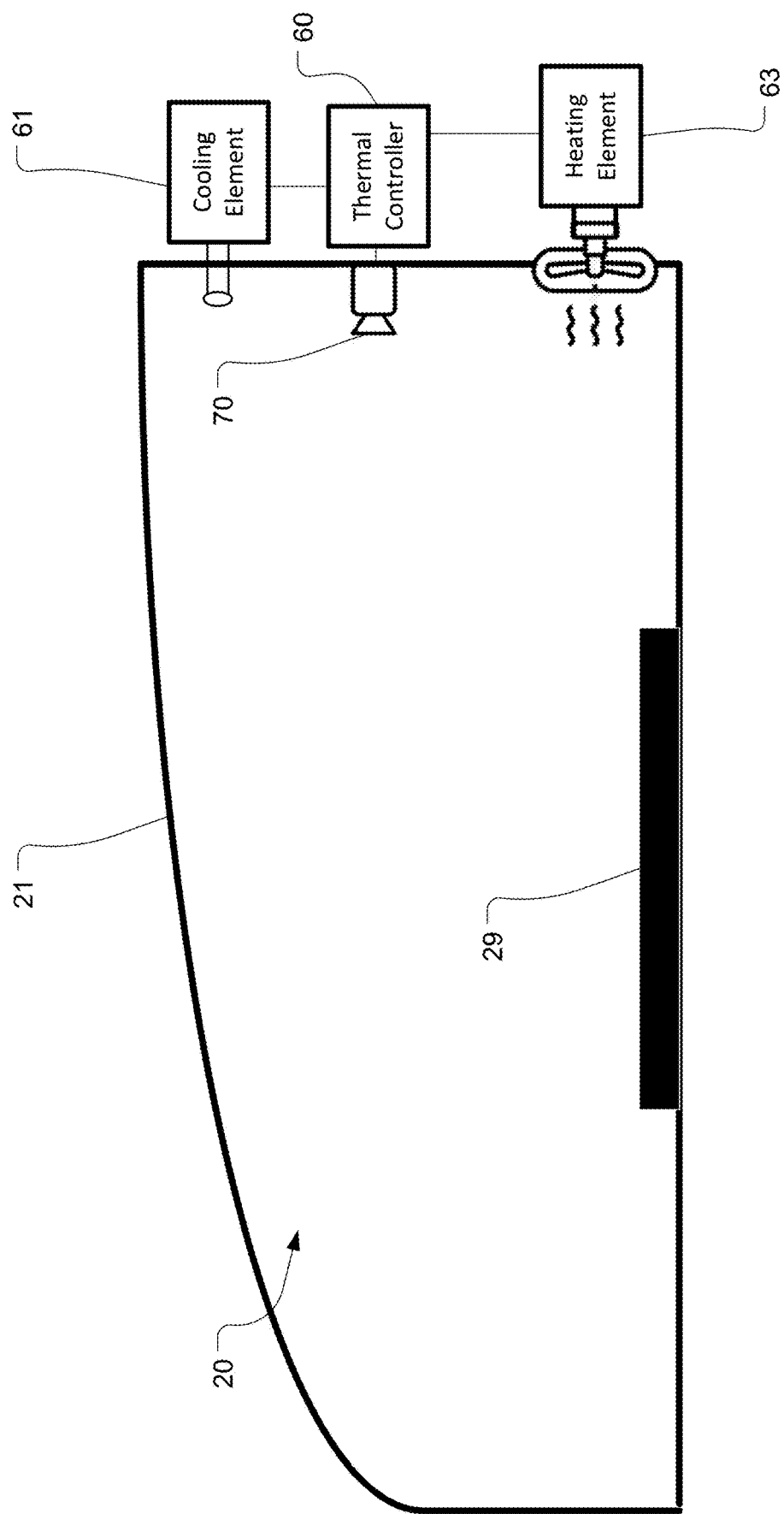
FIG. 22 is a side view of a trunk having a conductive heating or cooling plate in accordance with another embodiment.

FIG. 22 is a side view of a trunk 20 having a conductive heating or cooling plate 29. The trunk 20 may include multiple cooling and/or heating plates 29 upon which one or more objects may be placed to provide conductive heat transfer to the objects to keep them warm or cool. FIG. 22 also depicts the thermal controller 60 connected to the cooling element 61 and the heating element 63 for controlling the cooling and heating of the trunk 20. FIG. 22 also depicts the thermal controller 60 connected to the thermal imager 70 to obtain temperature measurements of the object. The thermal controller 60 may be configured to use the temperature measurements of the object from the thermal imager 70 to control the cooling element 61 and/or heating element 63.

Figure 23:
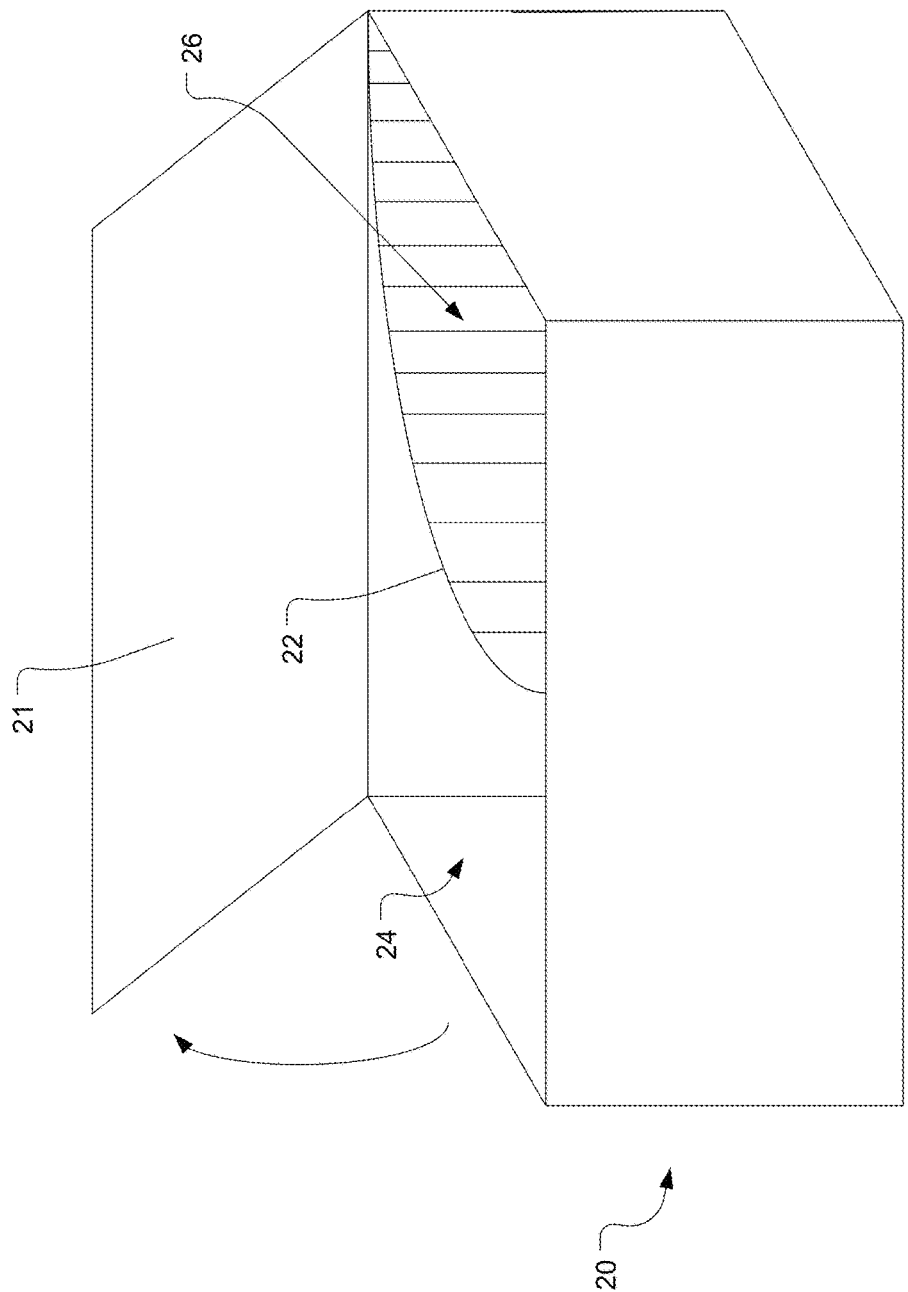
FIG. 23 is a perspective view of a divisible trunk with an articulated/segmented divider.

FIG. 23 is a perspective view of a divisible trunk 20 with an articulated/segmented divider 22 that is shown, in this example, following a curved path inside the trunk to divide the trunk into the first and second trunk compartments 24, 26. The divider may be formed of a series of vertically elongated slats that are pivotally or hingedly connected to form the divider. In other words, the divider may be a partition composed of articulated panels. A curtain or pliable material may also be used to form a curved partition.

Figure 24:
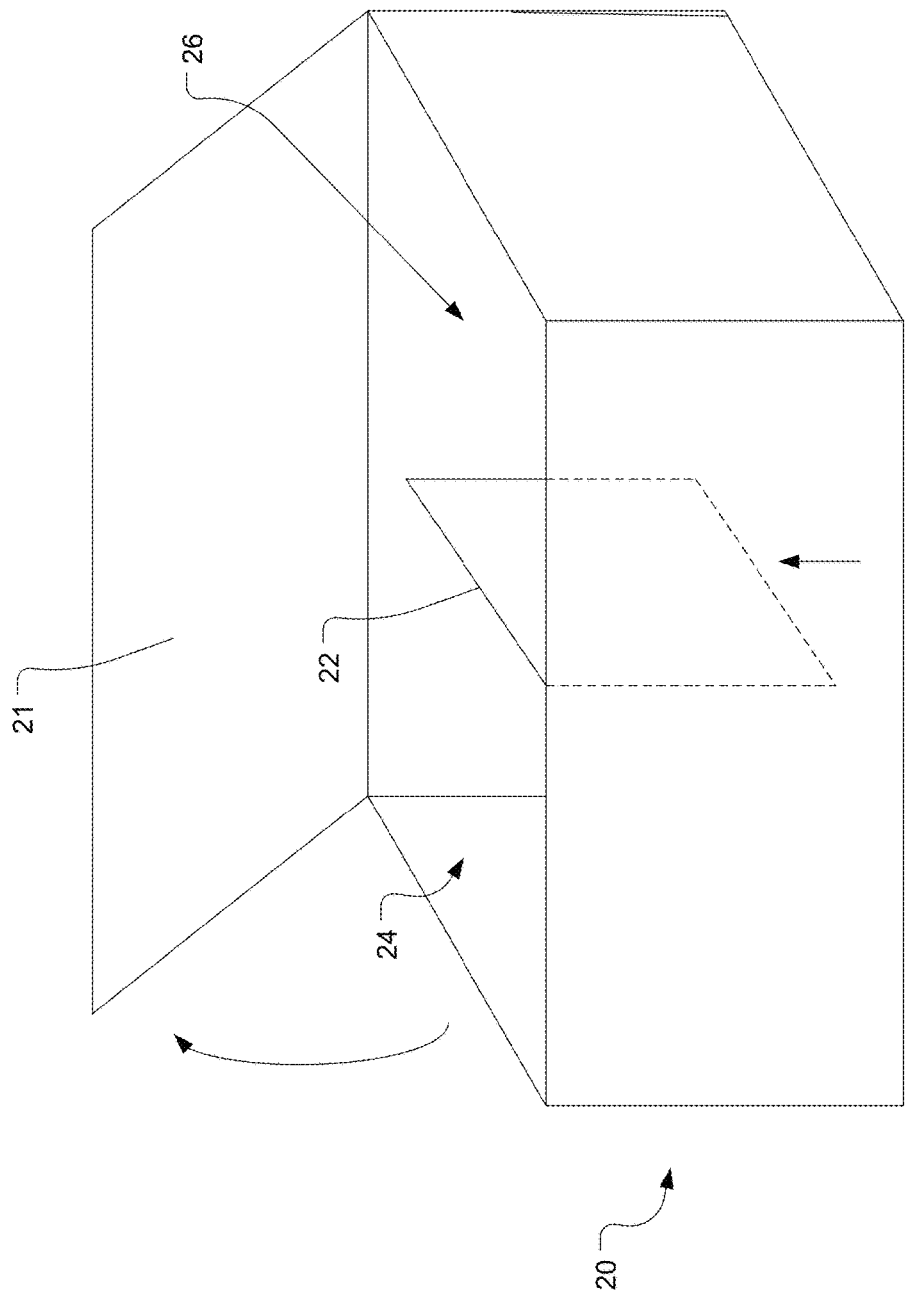
FIG. 24 is a perspective view of a divisible trunk with a vertically sliding divider.

FIG. 24 is a perspective view of a divisible trunk 20 with a vertically sliding divider 22. The divider is a planar element, e.g. rigid panel. The divider 22 may slide upwardly into an operative position or, in another embodiment, downwardly into the operative position. In a variant, the divider may slide horizontally, e.g. forwardly and rearwardly, or alternatively it may slide obliquely.

Figure 25:
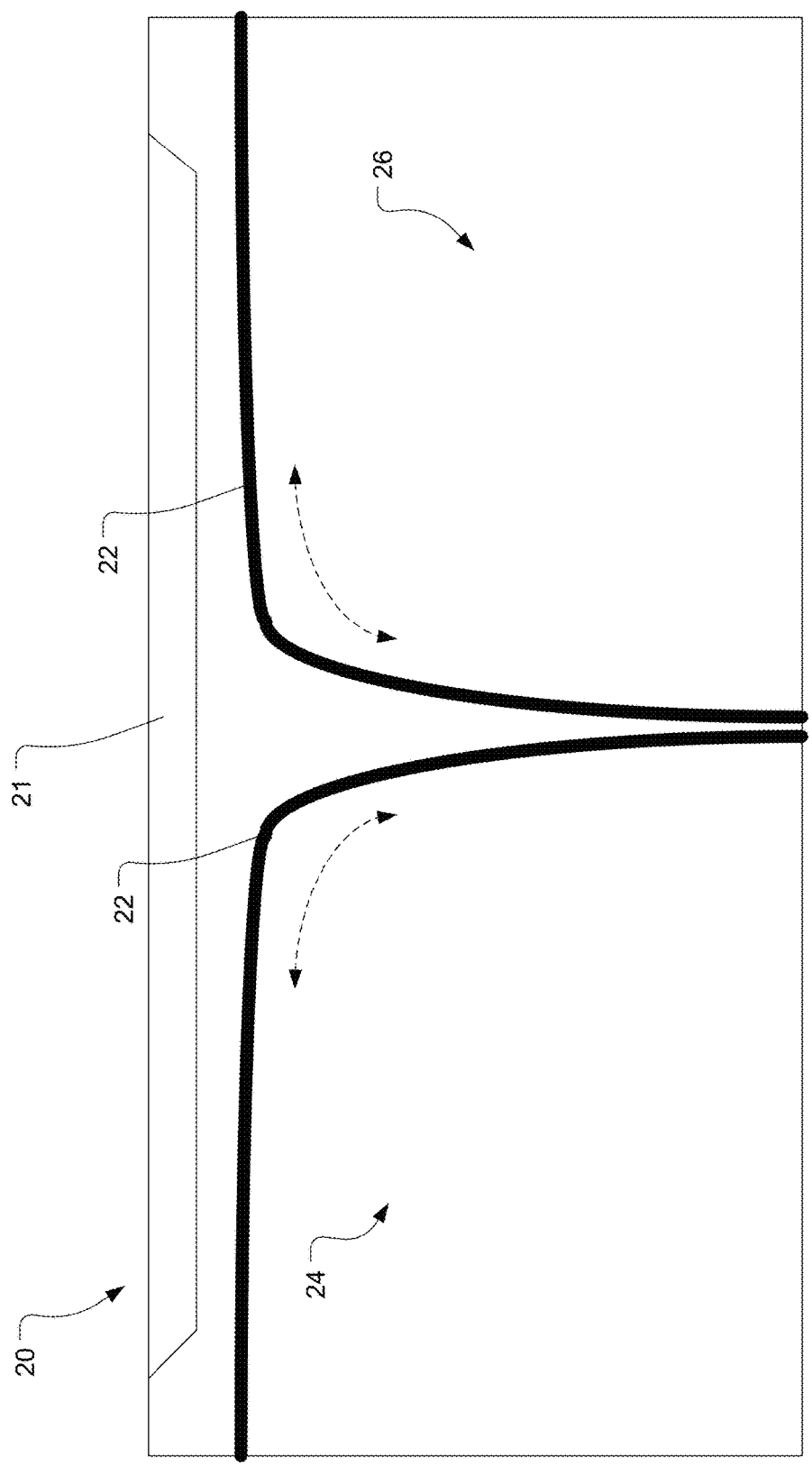
FIG. 25 is a rear view of a divisible trunk having two roll-down shutter-like dividers.

FIG. 25 is a rear view of a divisible trunk 20 having two roll-down shutter-like dividers 22. A common actuator may displace both dividers simultaneously or two separate actuators may be used to individually displace each of the dividers 22. The dividers may have rollers and these rollers may roll in tracks. A locking mechanism may be provided to lock or secure the dividers in place (either in the operative position or in the inoperative position).

Figure 26:
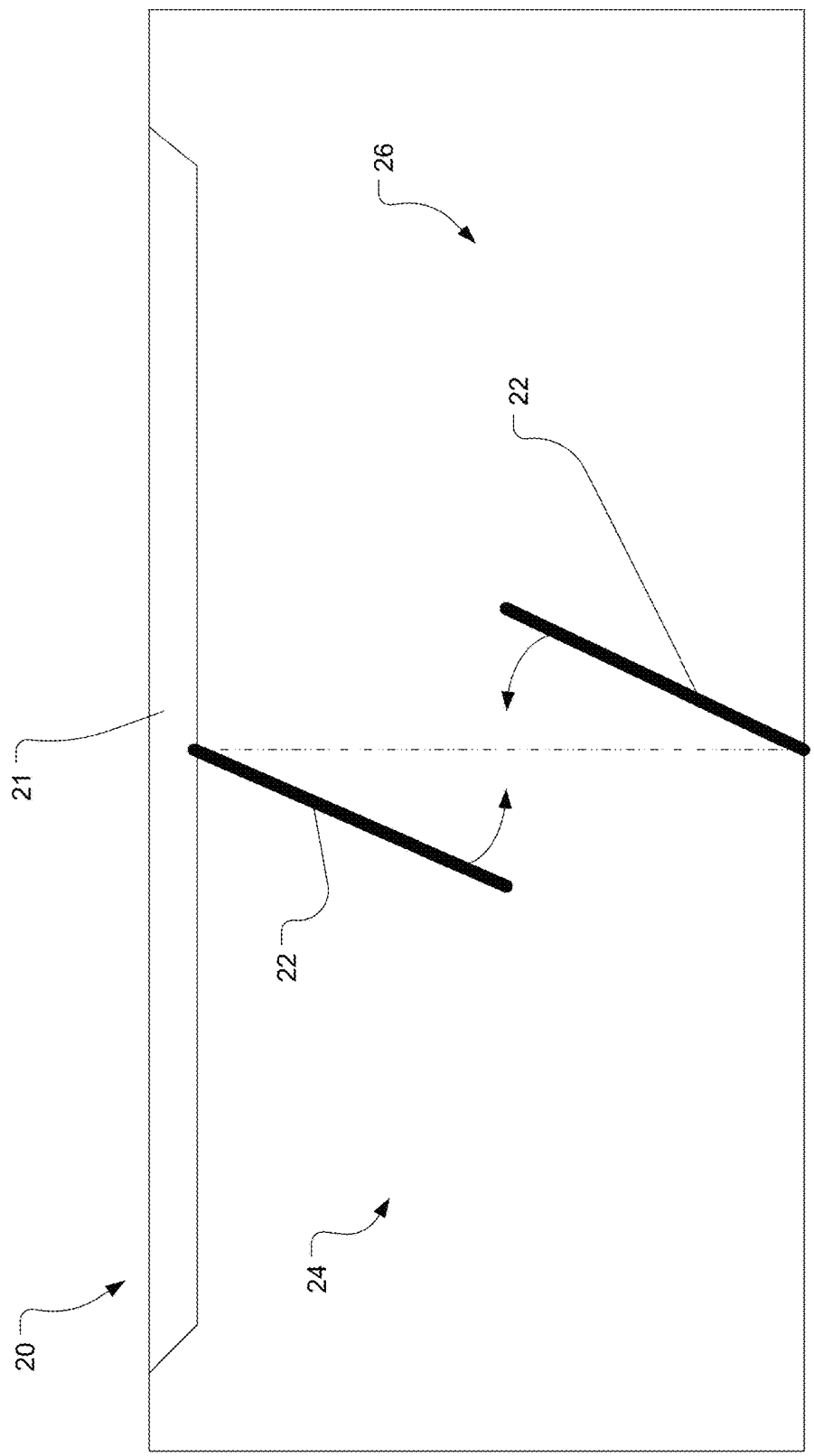
FIG. 26 is a rear view of a divisible trunk with a divider formed by two pivoting panels.

FIG. 26 is a rear view of a divisible trunk 20 with a divider 22 formed by two pivoting panels. A gasket, seal or liner may optionally be provided along a free edge of each pivoting panel to form an airtight seal at an interface where the free edges meet.

Figure 27:
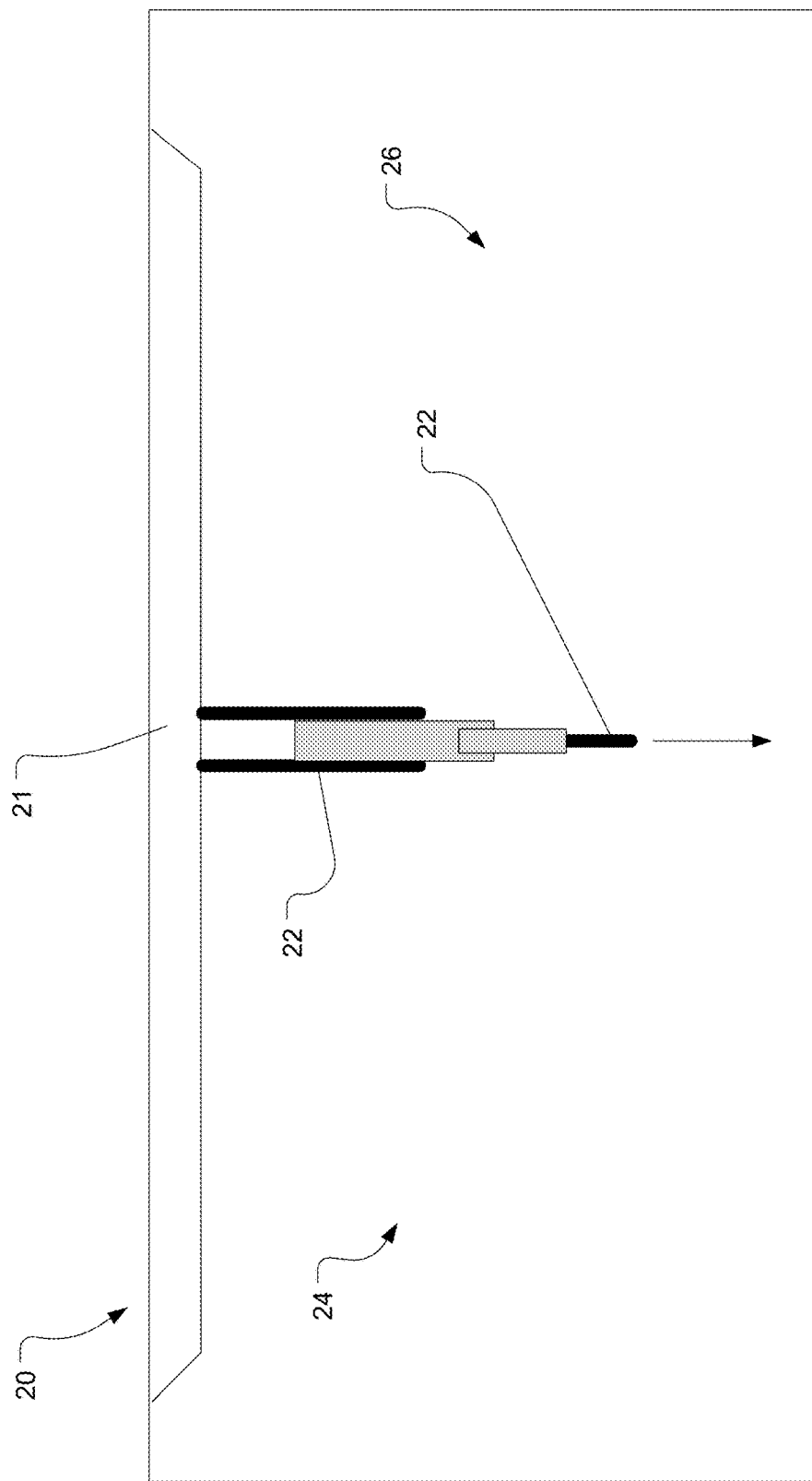
FIG. 27 is a rear view of a divisible trunk with a series of slidable panels that extend and retract telescopically to define a trunk divider to divide the divisible trunk.

FIG. 27 is a rear view of a divisible trunk 20 with a series of slidable panels that extend and retract telescopically to define a trunk divider 22 to divide the divisible trunk 20. In this embodiment, the divider extends downwardly. In a variant, the divider may extend upwardly. In another embodiment, the mechanism may act horizontally.

Figure 28:
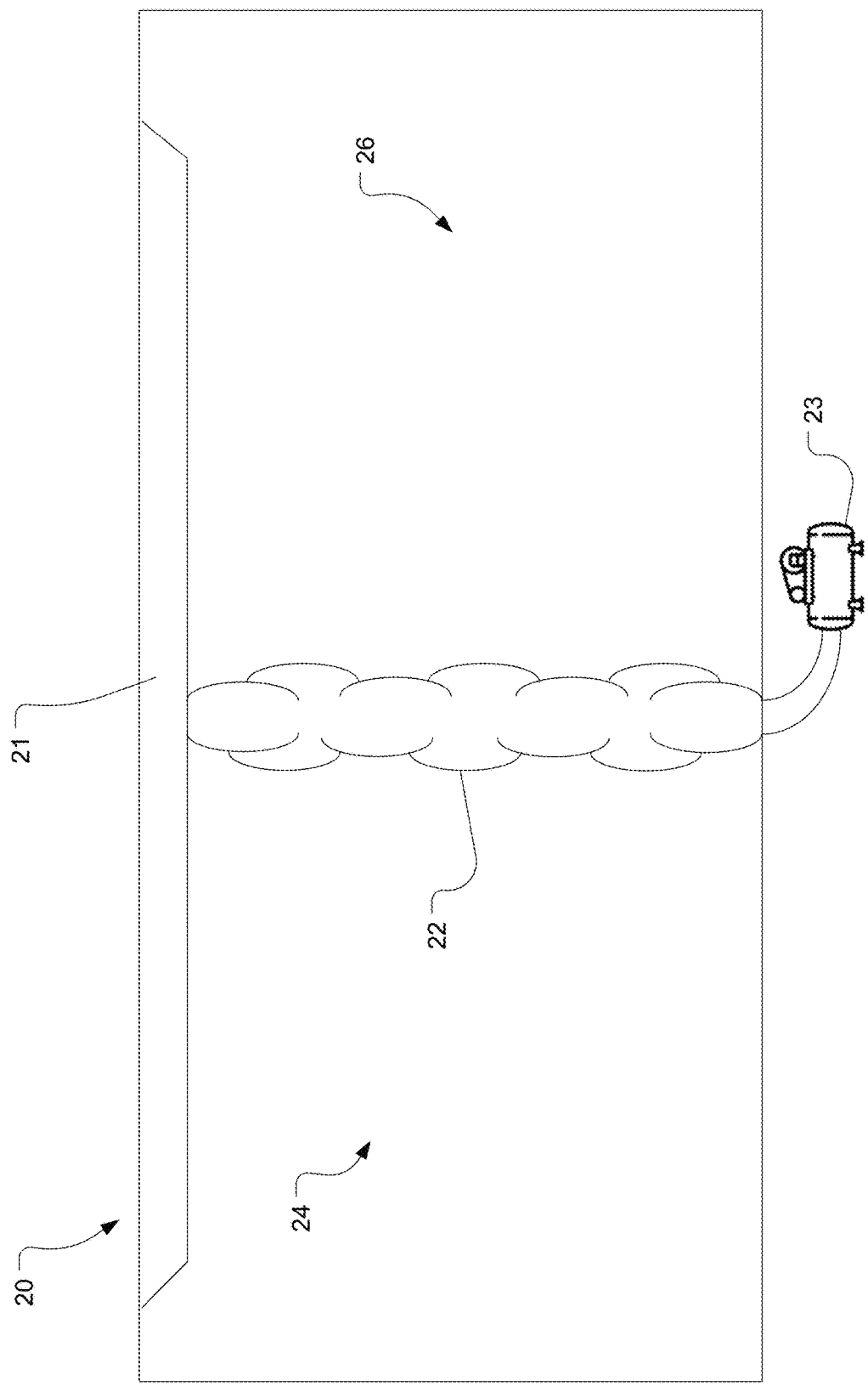
FIG. 28 is a rear view of a divisible trunk with an inflatable bladder that forms a divider to divide the divisible trunk.

FIG. 28 is a rear view of a divisible trunk 20 with an inflatable bladder that forms a divider 22 to divide the divisible trunk. The inflatable bladder may be inflated by an air pump or air compressor 23 as shown to a pressure that exceeds that inside the rest of the trunk so as to form an airtight seal dividing the trunk into two separate trunk compartments.

Figure 29:
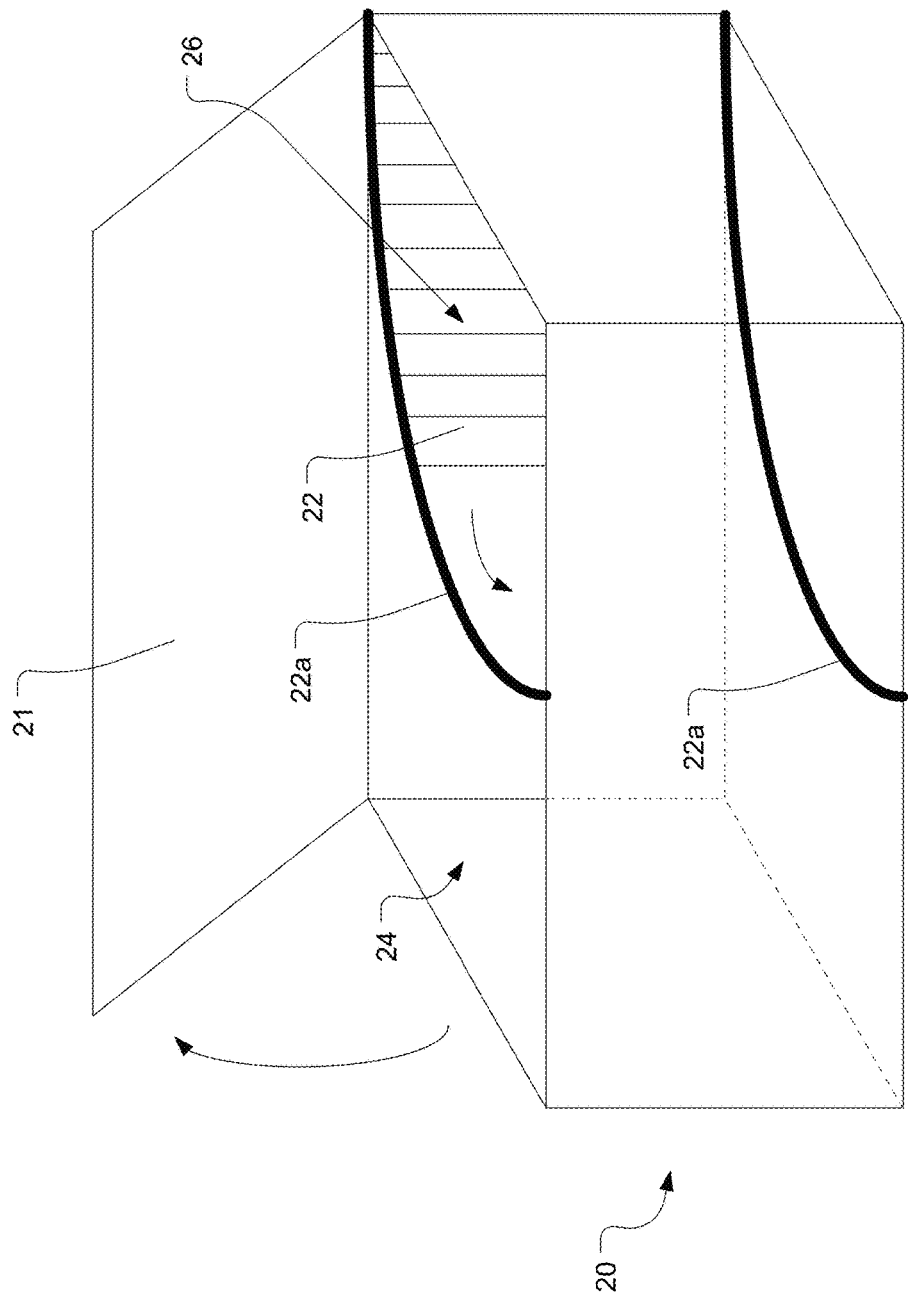
FIG. 29 is a perspective view showing guiding grooves or rails for guiding the divider to divide the divisible trunk.

FIG. 29 is a perspective view showing guiding grooves 22a or rails for guiding the divider 22 to divide the divisible trunk 20. The guiding grooves or rails constrain the motion of the divider to enable the divider to travel along predetermined paths to define predetermined compartments inside the trunk 20. In FIG. 29, there are grooves/rails on both the top surface and/or in the lid 21 of the trunk 20 as well in the floor (i.e. bottom surface) of the trunk 20. In a variant, the grooves/rails may be disposed only on the bottom surface or only in the top surface and/or in the lid.

Figure 30:
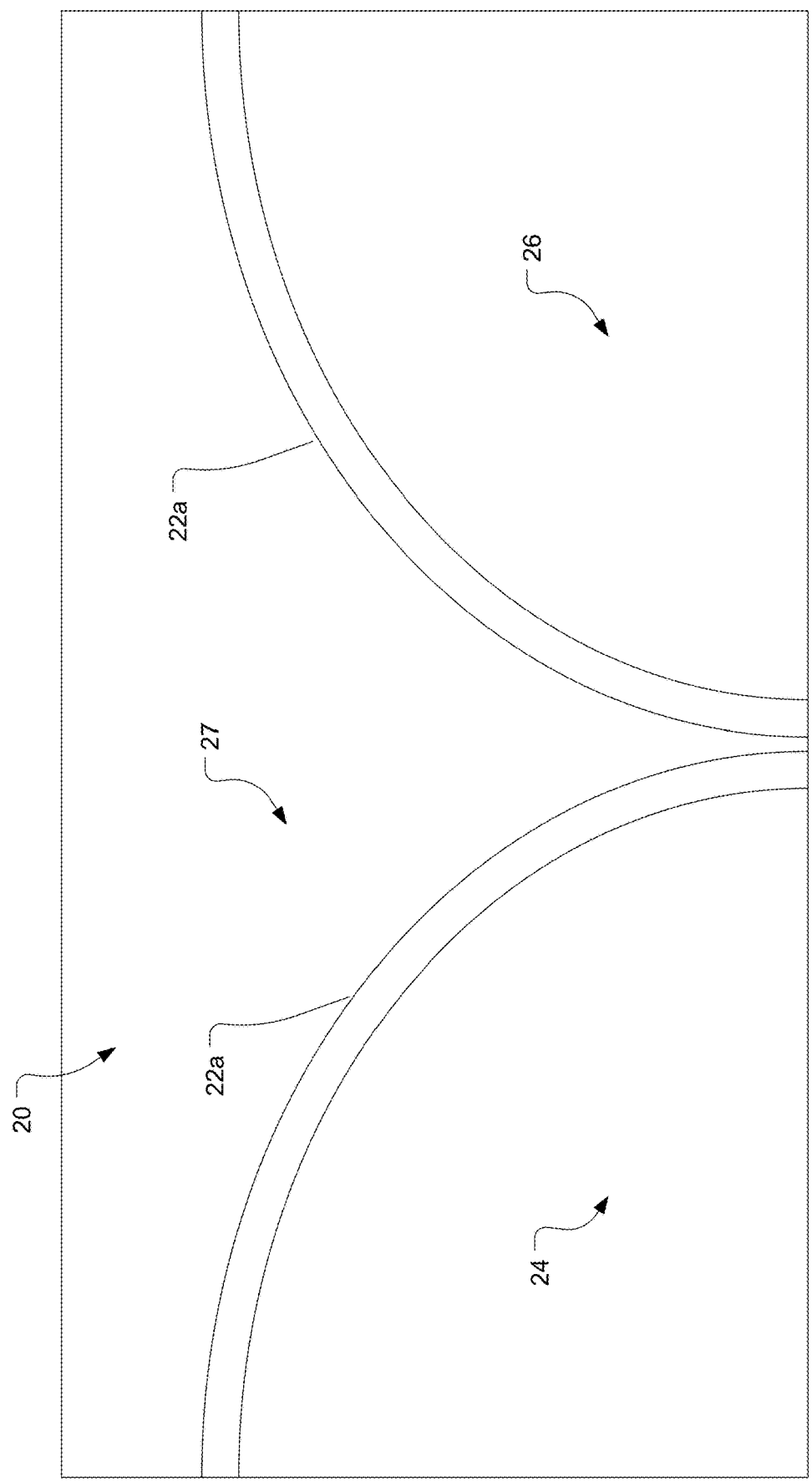
FIG. 30 is a top view of a divisible trunk showing two sets of guiding grooves.

FIG. 30 is a top view of a divisible trunk 20 showing two sets of guiding grooves 22a. These grooves 22a are curved to guide two curved dividers 22 along respective paths to define first and second trunk compartments 24, 26. In addition, a third trunk compartment 27 is formed in the rearward portion of the trunk 20 as shown in this figure. It will be appreciated that the shapes and sizes of the dividers 22 and the consequent shapes and sizes of the trunk compartments 24, 26, 27 are presented solely by way of example. The trunk 20 may be divided in many other different ways as will be appreciated. Although the foregoing show generally vertical dividers, in other embodiments the trunk may be divided by a horizontal divider into an upper trunk compartment and a lower trunk compartment. The upper compartment may be a warmed compartment and the lower compartment may be a cooled compartment.

Figure 31:
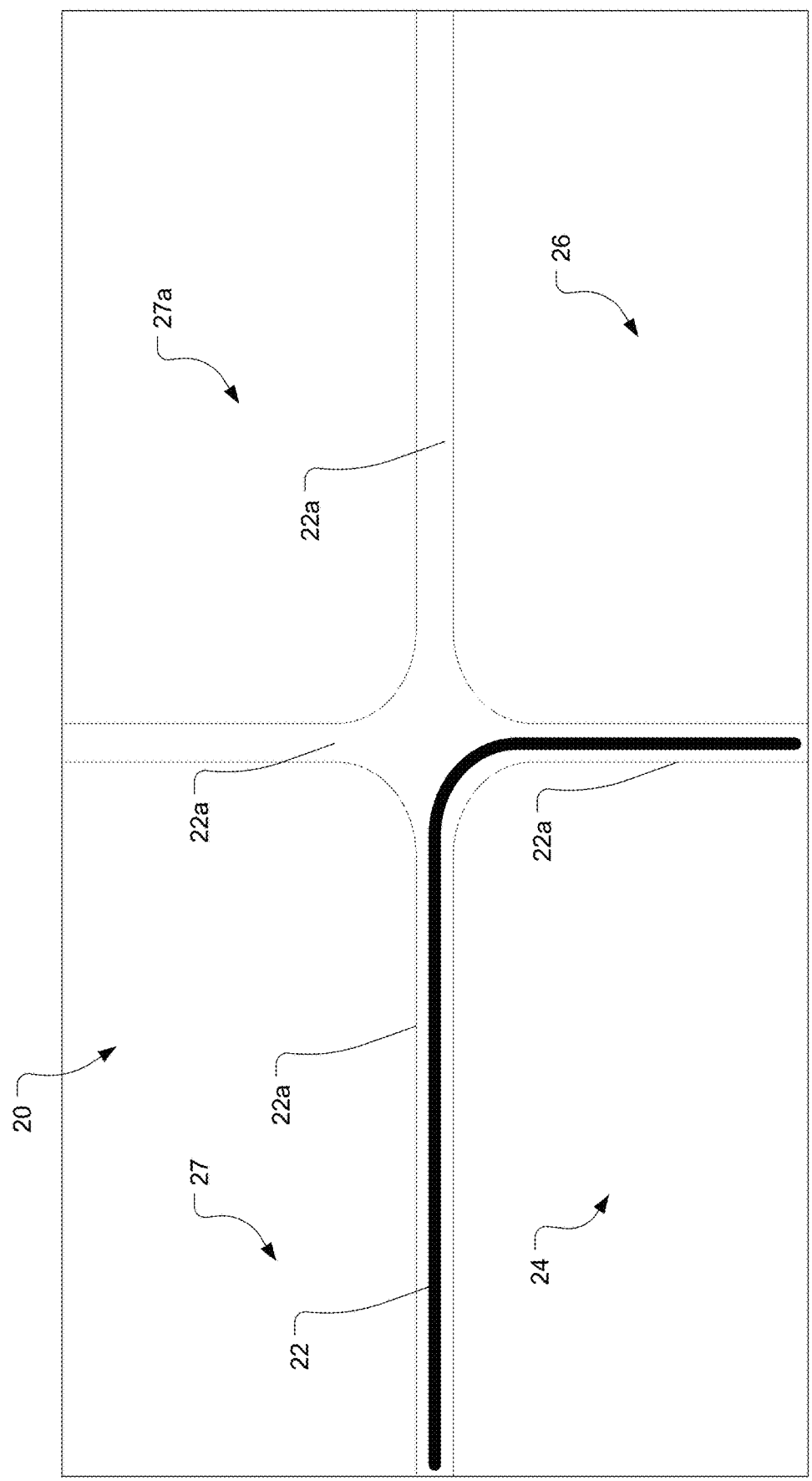
FIG. 31 is a top view of a divisible trunk showing divider-guiding grooves to provide different configurations of the divisible trunk.

FIG. 31 is a top view of a divisible trunk 20 showing divider-guiding grooves 22a to guide the divider 22 so as to provide one of a plurality of different configurations of the divisible trunk 22. The divider 22 may be displaced in the grooves 22a to create different trunk compartments 24, 26, 27, 27a.

In most of the foregoing embodiments, the processor 40 automatically sets an appropriate setpoint temperature for each of the trunk compartments based on machine recognition of the objects being placed into the trunk compartments. However, as mentioned above, in at least one embodiment, the user may specify or manually adjust the setpoint temperatures for the trunk compartments. User adjustment of temperatures may be done in the vehicle using vehicle dashboard controls, trunk-mounted controls, or the trunk-mounted user interface 110. User adjustment of temperatures may also be done remotely using a mobile communication device.

Figure 32:
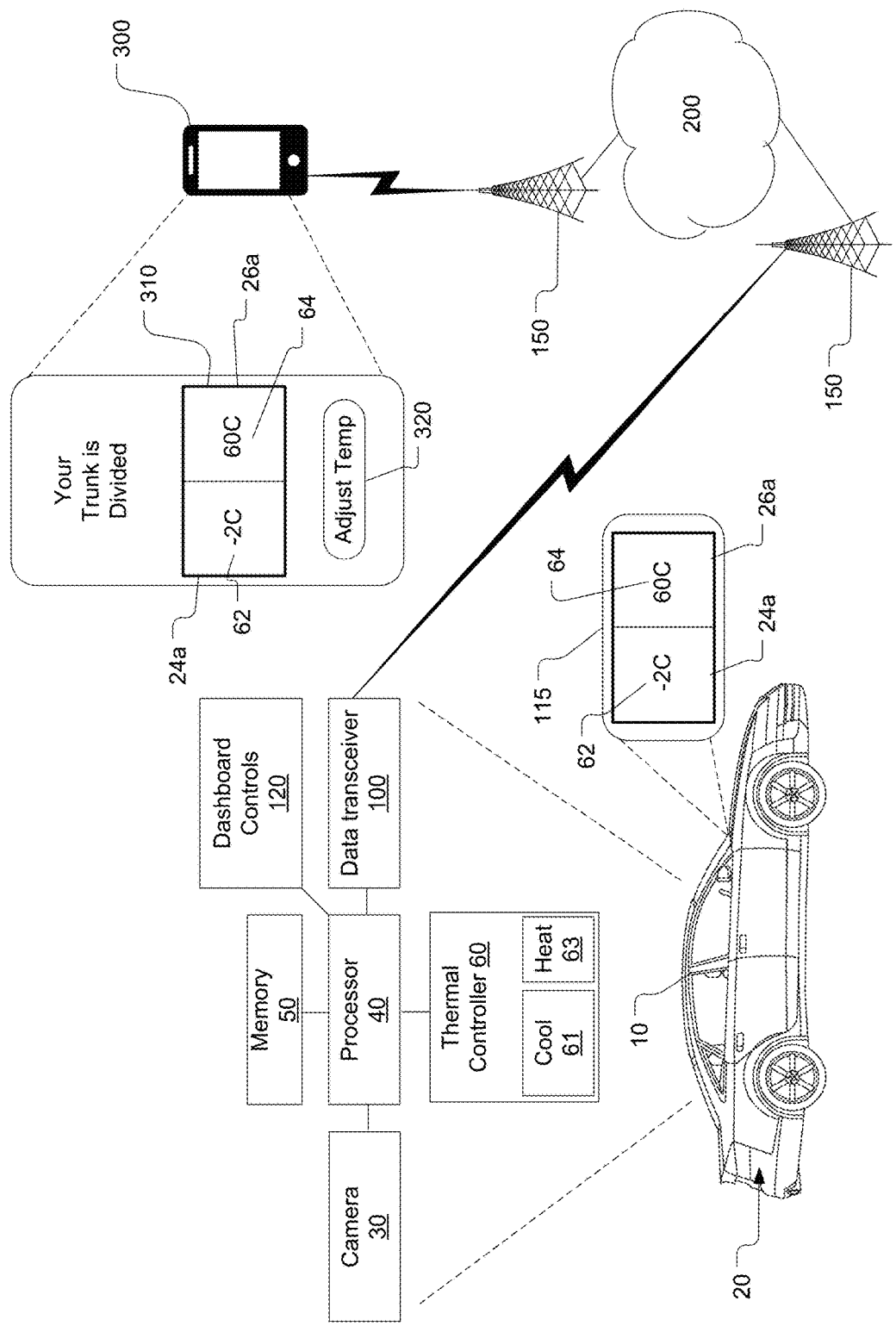
FIG. 32 depicts a vehicle displaying representations of trunk compartments and setpoint temperatures on a dashboard display screen and a mobile communication device also displaying representations of trunk compartments and setpoint temperatures.

In the embodiment depicted in FIG. 32, the vehicle 10 comprises a dashboard display screen 115 to display a representation of the divisible trunk 20 showing first and second representations 24a, 26a of the first and second compartments 24, 26, the first and second setpoint temperatures 62, 64, and the first and second temperatures, wherein the dashboard display screen also includes a first user interface element to adjust the first setpoint temperature 62 for the first trunk compartment 24 and a second user interface element to adjust the second setpoint temperature 64 for the second trunk compartment 26.

As further depicted in FIG. 32, the vehicle 10 may alternatively use the radiofrequency transceiver 100 to transmit trunk data to a mobile communication device 300 to enable the mobile communication device 300 to display a representation 310 of the divisible trunk 20 showing first and second representations 24a, 26a of the first and second compartments 24, 26 divided by the trunk divider 22 and also showing the first and second setpoint temperatures 62, 64, and further displaying a user interface element 320 on the mobile communication device 300 to enable adjustment of the first and second temperatures via the mobile device communication device 300. The radiofrequency transceiver 100 is configured to receive a temperature adjustment signal from the mobile communication device 300 and to provide the temperature adjustment signal to the processor 40 to adjust, via the thermal controller 60, the first setpoint temperature 62 for the first trunk compartment 24 and/or the second setpoint temperature 64 for the second trunk compartment 26.

Figure 33:
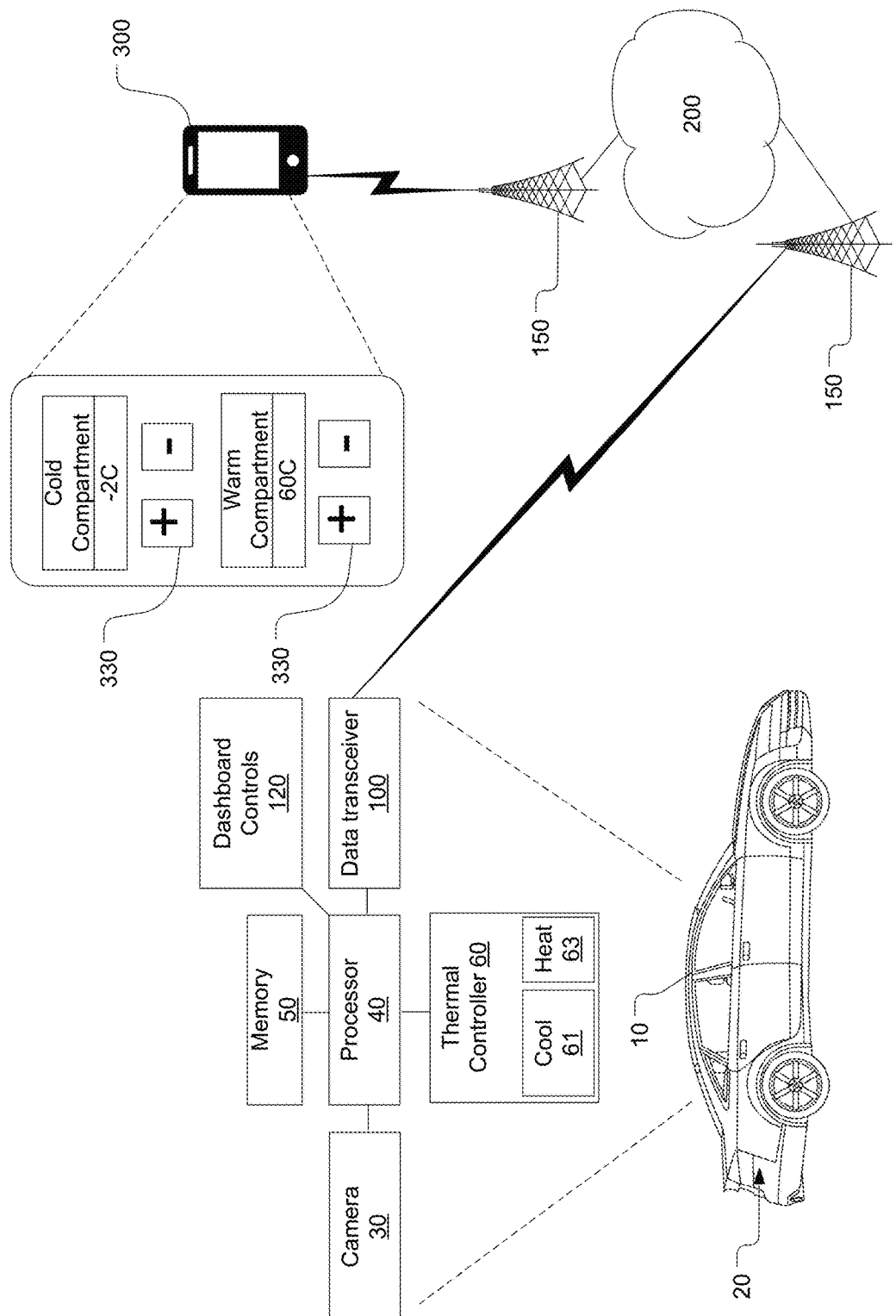
FIG. 33 depicts a vehicle and associated mobile communication device displaying user interface elements for adjusting setpoint temperatures of trunk compartment of a divided trunk of the vehicle.

FIG. 33 depicts a vehicle 10 with dashboard controls 120 (user interface elements, i.e. touch-sensitive user-selectable elements or any suitable virtual or real buttons, switches, toggles, dials, etc.) to set the setpoint temperatures and/or to increase or decrease cooling and/or heating of the first and second compartments of the divisible trunk 20. The dashboard controls 120 may provide a user interface element to specify the first and second setpoint temperatures, to increase or decrease the setpoint temperatures, and to view both the current (measured) temperatures inside the trunk compartments and the setpoint temperatures. The dashboard controls may be communicatively connected to the processor as shown in FIG. 33. The processor 40 may be configured to use dashboard controls to override the automatically determined setpoint temperatures in one embodiment. Additionally or alternatively, a user can adjust the setpoint temperatures 62, 64 using one or more user interface elements 330 (e.g. a plus (+) button and a minus (—) button) that are displayed on the display screen of the mobile communication device 300. Using the mobile communication device 300 to remotely control the temperatures of the trunk compartments is particularly useful in the case of an unoccupied autonomous vehicle that is, for example, sent on an errand to pick up groceries or any other temperature-sensitive objects. In the illustrated embodiment, the mobile communication device 300 displays a setpoint temperature for each trunk compartment simultaneously with the one or more user interface elements 330 to enable the user to adjust the setpoint temperature in each trunk compartment. The setpoint temperatures may also be adjusted via the user interface 110 mounted to the inside lid of the trunk or to another location within the trunk.

In another embodiment, the vehicle transmits temperature alerts to the mobile communication device 300 when the vehicle is parked and the user has left the objects in the trunk. For a cold object, if the temperature increases by a predetermined amount, the vehicle transmits an alert to the mobile communication device 300. Similarly, for a warm object, if the temperature decreases by a predetermined amount, the vehicle transmits an alert to the mobile communication device 300. The alert may specifically name the object. For example, the alert may indicate that the ice cream in the trunk may melt because the temperature has risen 15 degrees. Alternatively, when the vehicle is parked and the occupant disembarks, the vehicle and/or mobile communication device may notify the user that the cooling or heating will either continue, diminish or stop. The vehicle and/or mobile communication device may predict how long the cooling or hearing may be off before the object(s) are affected, ruined or damaged. A countdown timer, alarm and/or reminder may be provided to enable the user to remember not to leave the object(s) in the vehicle beyond the recommended time. The mobile communication device may send, as the user's request or command, a message or signal to the vehicle to turn on the cooling or heating that had been previously shut off.

Figure 34:
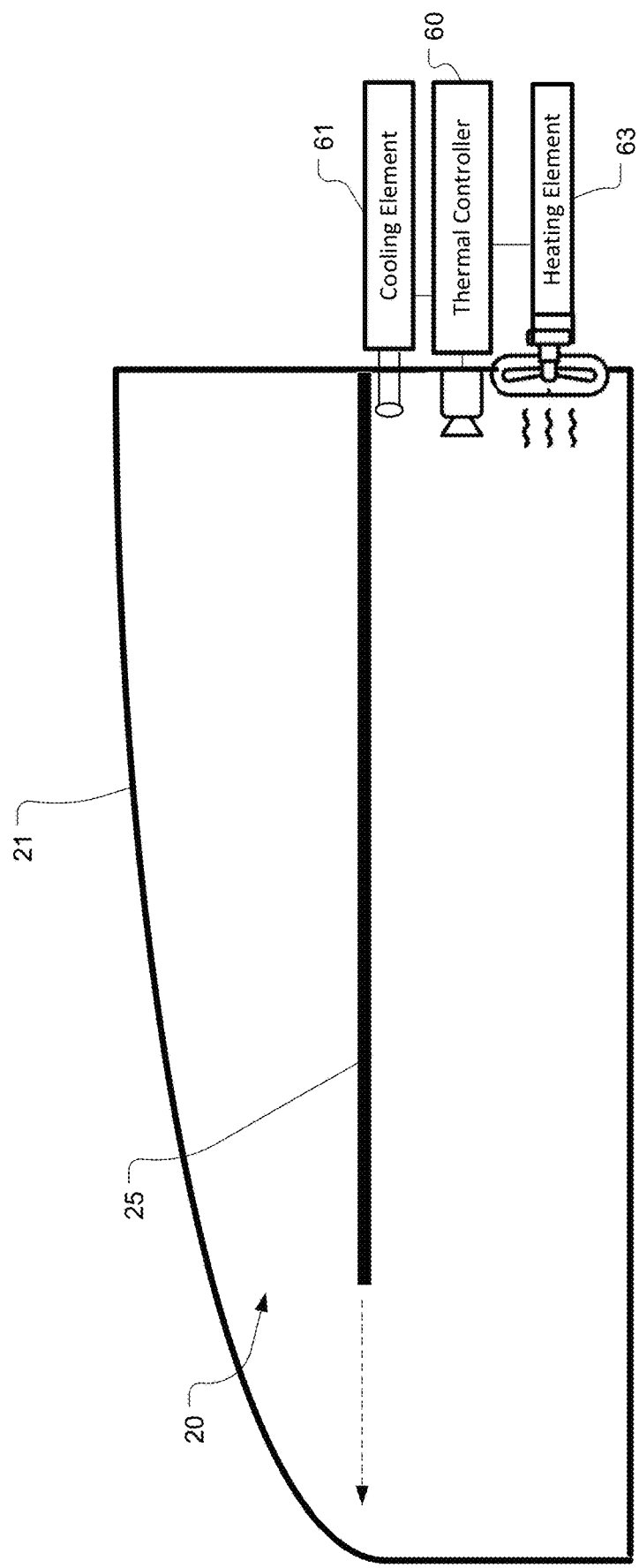
FIG. 34 depicts a divisible trunk having a movable top cover that is being deployed beneath the lid to cover the contents of the divisible trunk and to provide a flat upper surface for the trunk compartments to enable or facilitate deployment of a fixed-height divider.

FIG. 34 depicts a divisible trunk 20 having a movable top cover 25 that is being deployed beneath the lid 21 to cover the contents of the divisible trunk and to enable or facilitate deployment of a fixed-height divider. Otherwise, without a flat upper surface, the upper part of the divider must be shaped to conform to the contours of the inside of the lid of the trunk to provide an airtight partition between the first and second compartments. The movable top cover 25 may be deployed manually (e.g. by pulling it) or automatically (by actuating the movable top cover 25 using an electrically powered cover deployment mechanism). The movable top cover 25 is shown as a flat (planar) horizontal structure although other shapes may be used. The movable top cover 25 may be parallel to the lower cargo platform of the trunk. The movable top cover 25 may be a rigid structure or it may be a flexible or pliable material. The movable top cover 25 have a heat-reflecting outer surface or surfaces. Likewise, the divider(s) may have a heat-reflecting surface or surfaces.

Figure 35:
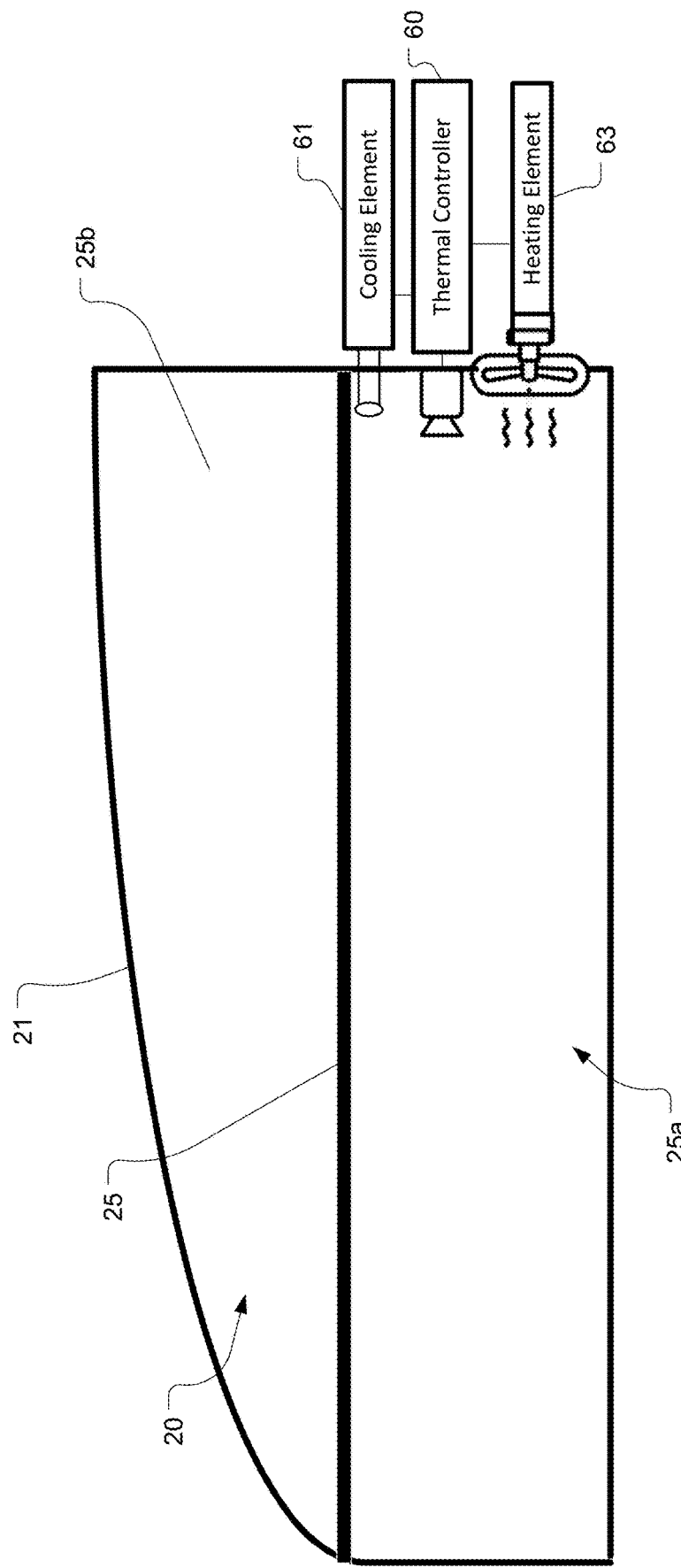
FIG. 35 depicts a divisible trunk showing the movable top cover fully deployed to thereby partition the trunk into a lower climate-controlled zone and an upper ambient-temperature zone that is not climate-controlled.

FIG. 35 depicts a divisible trunk 20 showing the movable top cover 25 fully deployed to thereby partition the trunk into a lower climate-controlled zone 25a and an upper ambient-temperature zone 25b that is not climate-controlled. The lower climate-controlled zone 25a is divided into the first and second compartments. In this embodiment, there are cool and warm compartments and a neutral/ambient temperature compartment.

Figure 36:
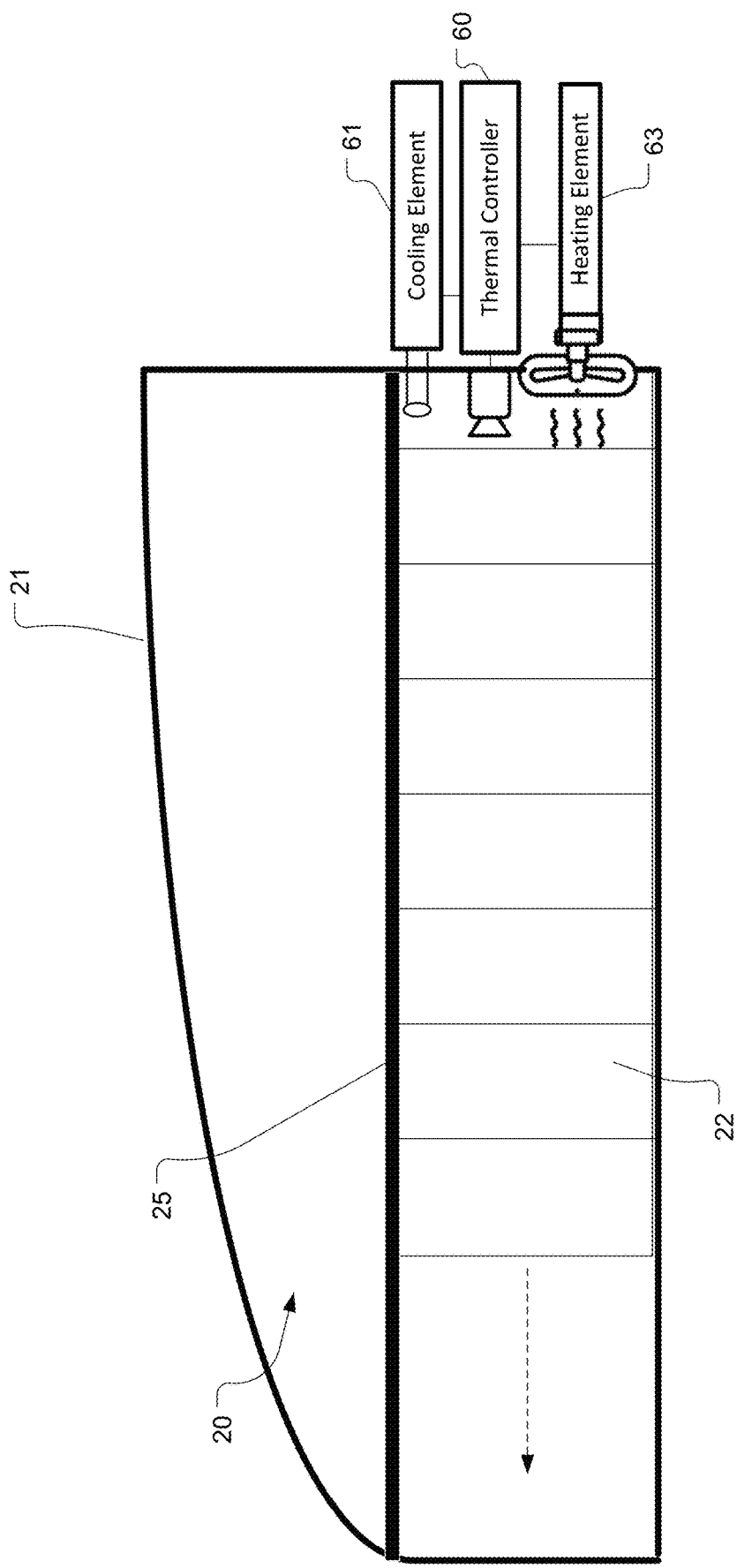
FIG. 36 depicts the divider being deployed after the movable top cover has been fully deployed.

FIG. 36 depicts the divider 22 being deployed after the movable top cover 25 has been fully deployed. In this embodiment, the divider 22 comprises a plurality of articulated vertical slats. As shown in this embodiment, the top of the divider 22 is flush with the underside of the movable top cover 25. If the fit is suitably tight, this arrangement can provide an airtight seal between the first and second compartments. However, it should be appreciated that an airtight seal is not essential for this invention to operate effectively; some degree of air leakage or even a small amount of airflow between compartments may be tolerable provided the relative cooling and heating can still be achieved in each compartment.

Figure 37:
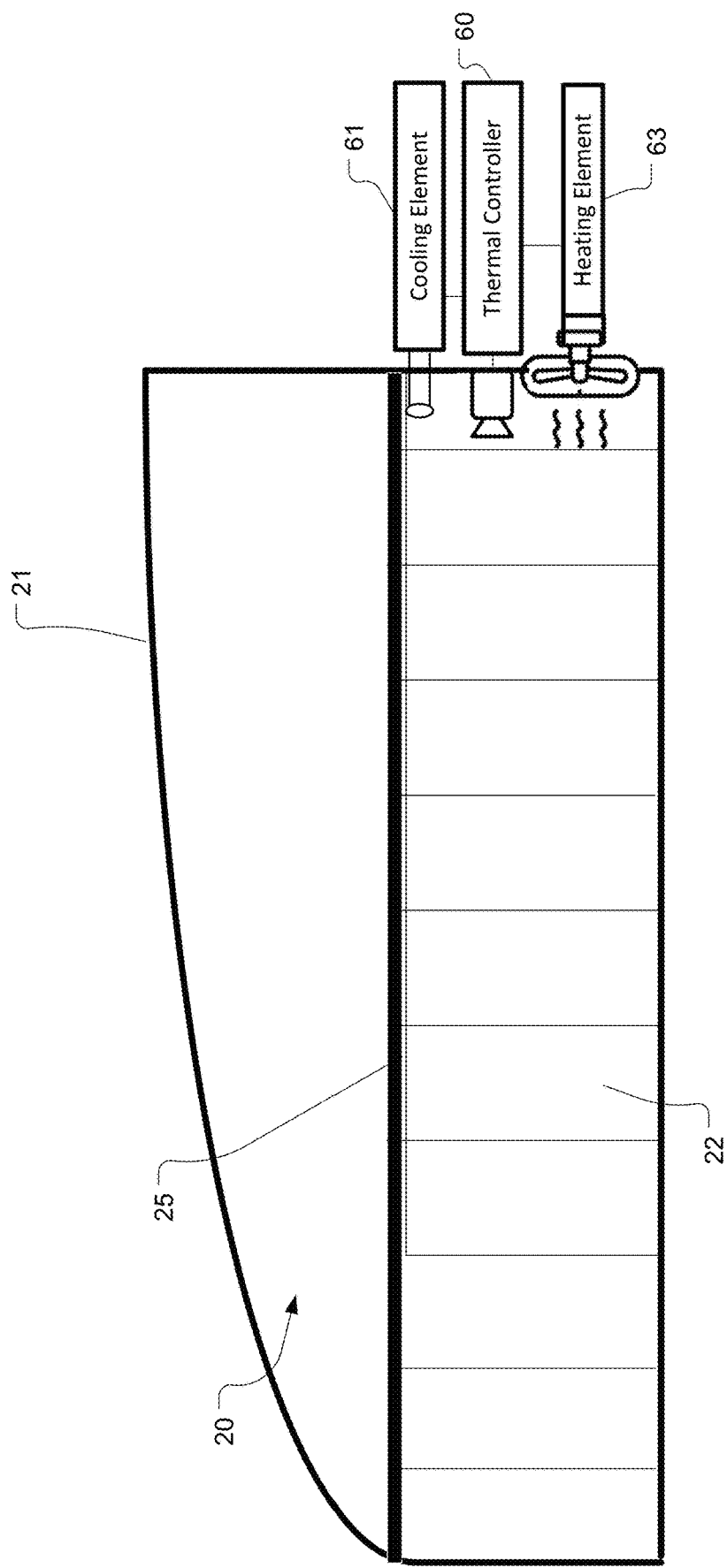
FIG. 37 depicts the divider fully deployed to divide the divisible trunk into first and second compartments beneath the movable top cover.

FIG. 37 depicts the divider 22 fully deployed to divide the divisible trunk into first and second compartments beneath the movable top cover 25. In one embodiment, the underside of the top movable 25 has a groove, rail or other such structure to guide the divider. The underside of the movable top cover 25 may have multiple grooves, rails or other such structures to provide a plurality of ways of dividing the trunk.

The divider(s) may be deployed or stowed manually or automatically. The dashboard or the mobile communication device may also be used to receive user input to cause the vehicle to deploy or stow the divider(s) of the divisible trunk. The dashboard or the mobile communication device may display a representation of the trunk to enable the user to provide touch input (e.g. draw, drag, touch, etc.) to place the divider(s). The dashboard or mobile communication device may also present predetermined trunk divisions or configurations from which the user can select. Although the divider(s) may be deployed and stowed manually, the divider(s) may be deployed or stowed automatically in response to the vehicle detecting an event or condition. Likewise, the cooling or heating may be automatically commenced in response to the vehicle detecting an event or condition. In one implementation, the user interface 110, which is disposed in the trunk or on the inside of the lid of the trunk or elsewhere within the trunk, enables the user to configure the trunk divider(s). The user interface 110 may depict various predetermined divisions (e.g. half-half, one-third/two-thirds, one-quarter/three-quarters, etc.). The user interface 110 receives a user selection of a desired trunk division from the user and then deploys the divider(s) to divide the trunk as requested by the user. The user interface 110 may also enable the user to set a setpoint temperature for each trunk compartment. The user interface 110 may receive touch commands or voice commands.

Figure 38:
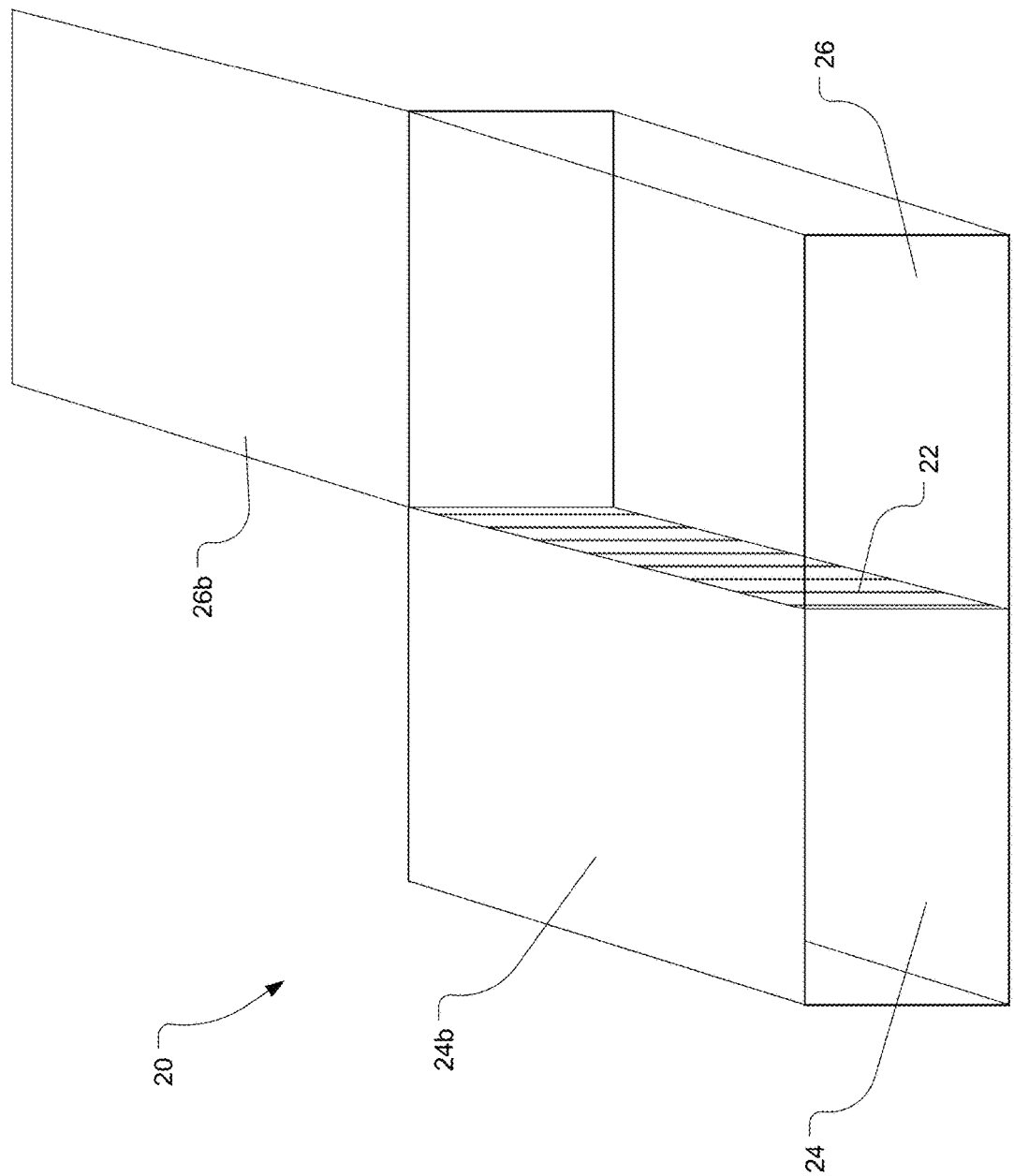
FIG. 38 depicts a divisible trunk having two independently movable top covers for covering the first and second compartments, respectively.

FIG. 38 depicts a divisible trunk 20 having a divider 22 for dividing the trunk into first and second compartments 24, 26 as described above and further having two independently movable top covers 24b, 26b for covering the first and second compartments, respectively. Each of these covers may be lockable. The independently movable top covers 24b, 26b may be hinged to pivot or may be slidable or may be configured to open and close in any suitable manner.

Figure 39:
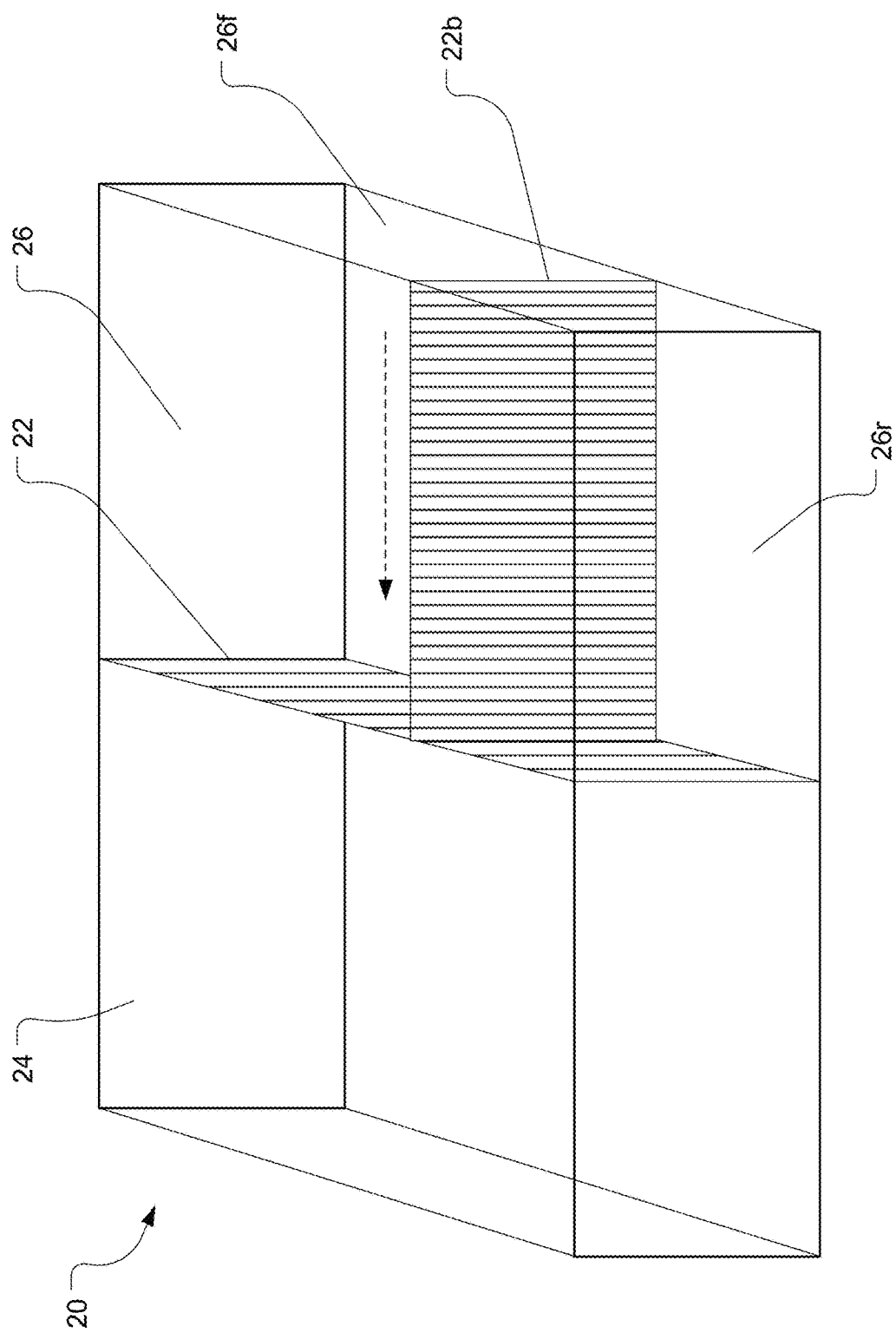
FIG. 39 depicts a divisible trunk having a transverse divider to further divide one of the compartments.

FIG. 39 depicts a divisible trunk 20 having a divider 22 for dividing the divisible trunk into the first compartment 24 and the second compartment 26. The divider is a main longitudinal divider of the trunk. The divisible trunk 20 in this embodiment also includes a transverse divider 22b to further divide the second compartment 26 into a front compartment 26f and a rear compartment 26r. The temperatures in the front compartment 26f and the rear compartment 26r may be independently controlled. For example, the user may place ice cream in the front compartment 26f at a temperature below the freezing point and may milk in the rear compartment 26r at a temperature slightly above the freezing point. The transverse divider 22b extends in this embodiment from the right wall of the trunk and abuts the main longitudinal divider 22. Optionally, the transverse divider 22b may be configured to latch, attach or connect to the main longitudinal divider 22. The transverse divider 22b may be deployed manually or automatically using a deployment mechanism having a motor, servo, actuator or other suitable mechanism. In the example of FIG. 39, the second compartment is divided. It will be appreciated that the first compartment may also be divided. Alternatively, both the first and second compartment may be divided. Furthermore, the divided first and second compartments may themselves be further subdivided.

In one embodiment, the vehicle has a rear seat position sensor to detect whether a fold-down rear seat is in a folded-down configuration. If the vehicle detects that the fold-down rear seat is in a folded-down configuration, the vehicle outputs an alert to notify the user or occupant of the vehicle. The alert may notify the user or occupant that the cooling or heating of the trunk compartment(s) is inefficient or that the cooling or heating has been temporarily stopped until the fold-down rear seat is returned to its upright position.

In one embodiment, the camera and processor cooperate to screen objects being inserted into the trunk to ensure that the objects being inserted into the trunk are suitable to be transported in the trunk. The camera and processor may recognize dangerous objects and alert the user to the danger of transporting a particular object such as a propane gas tank, fireworks, explosive or combustible substances, etc. The camera and processor may also alert the user that the object being placed into the trunk is not properly transported in the trunk, e.g. a pet. The camera and processor may also prevent the trunk from being closed in one embodiment if the processor is configured to impose rules preventing the transport of certain types of objects in the trunk.

In one embodiment, the processor the vehicle outputs an alert or notification to a user either via the dashboard or the mobile communication device when the vehicle is inactivated, i.e. when the vehicle is parked, shut off or when the user disembarks. The alert or notification may indicate to the user that the object(s) in the trunk will be deleteriously affected if the temperature changes beyond a certain amount (beyond a temperature threshold or temperature tolerance of the object(s) in the trunk). Based on the ambient temperature (outside temperature) and other weather conditions (humidity, wind, solar load), the processor may estimate and indicate how long the object(s) may be left in the trunk. The processor may also indicate to the user whether the vehicle will maintain heating and/or cooling of the trunk compartments while the user has left the vehicle parked. The user may use the dashboard or mobile communication device to set parameters governing how the heater and/or cooler should operate while the user is away. For example, the user may specify that the vehicle should provide a minimal degree of cooling to keep groceries cool. The battery charge of the vehicle may be presented to the user via the dashboard or mobile device to inform the user how much battery charge will be used to cool or heat the trunk while parked. The range effect due to the usage of battery may be presented as well as an indication of whether there would remain sufficient charge to reach a destination such as home or work or a programmed or predicted destination based on historical usage patterns.

In one embodiment, the vehicle includes an air ventilation system for exhausting air from the trunk. This air ventilation system may include a fan, a duct and an outlet. The air ventilation system may be used to evacuate hot air from the trunk prior to cooling. The air ventilation system may be used to evacuate cold air from the trunk prior to heating. The air ventilation system may be used to evacuate odors or smells from the trunk as well. For example, after transporting hot prepared food, it may be desirable to rid the trunk of the residual odors of the food. In a variant, the air ventilation system may be used to send cool air or warm air into the passenger cabin depending on the climate control system settings in the passenger cabin.

Another aspect of the disclosure is a method of using a vehicle 10 to transport a first object and a second object in a divisible trunk 20 defining an enclosure. The method entails capturing, using a camera 30 a first image of the first object prior to being placed into the divisible trunk 20 and capturing, using the camera 30, a second image of the second object prior to being placed into the divisible trunk 20. The camera 30 generates first image data of the first image and second image data of the second image. The method entails receiving, by a processor 40, the first and second image data of the first and second images, and processing the first and second image data, using a machine-vision module 42 executed by the processor 40, to identify the first and second objects. Optionally, the processor cooperates with a user interface or output device to output the identification of the first and second objects. The output device may be a speaker. The speaker may announce aloud the names of the objects. For example, the speaker may announce "ice cream", "popsicles", "milk", "yogurt", etc. The speaker may alternatively announced "cold item". Or the speaker may announce the identification of the object ("ice cream") and then indicate the classification of the object as a cold or warm item ("ice cream . . . is a cold item"). The method entails generating and outputting by the processor 40 a divider signal to an actuator 28. The method entails causing the actuator 28 to displace a trunk divider 22 to divide the divisible trunk 20 into the first and second trunk compartments 24, 26. The method also entails generating and outputting, by the processor 40, a thermal control signal to a thermal controller 60 to control a first temperature of the first trunk compartment 24 by setting a first setpoint temperature 62 for the first trunk compartment 24 and to control a second temperature of the second trunk compartment 26 by setting a second setpoint temperature 64 for the second trunk compartment 26.

In one implementation, the method entails receiving object identification data identifying the first and second objects to be picked up by the vehicle operating autonomously, wherein the processor is communicatively coupled to the radiofrequency transceiver to pre-emptively actuate the trunk divider to divide the divisible trunk into the first and second compartments and to send the thermal control signal to the thermal controller to pre-emptively set the first and second setpoint temperatures for the first and second trunk compartments.

In one implementation, the method entails using the processor to cause the actuator to displace the trunk divider to pre-emptively divide the divisible trunk and to pre-emptively cause the thermal controller to set the first and second setpoint temperatures at a computed time prior to the vehicle autonomously opening the trunk, wherein the computed time is determined using a rate of cooling or heating of a heating or cooling element controlled by the thermal controller, a current trunk temperature and a current outside temperature.

In one implementation, the method entails using the processor to cause the actuator to displace the trunk divider to pre-emptively divide the divisible trunk and to pre-emptively cause the thermal controller to set the first and second setpoint temperatures a computed time prior to the vehicle autonomously arriving at a destination where the first and second objects are to be received into the trunk, wherein the computed time is determined using a rate of cooling or heating of a heating or cooling element controlled by the thermal controller, a current trunk temperature and a current outside temperature.

In one implementation, the method entails determining that there is insufficient battery charge for the vehicle operating autonomously to provide a minimal amount of cooling or heating required for the first or second object to be delivered to a home destination, and transmitting notification data to a mobile communication device to cause the mobile communication device to process the notification data to display a notification that there is insufficient battery charge to deliver the first or second object to the home destination, wherein the notification includes a prompt to cancel an order for the first or second object.

In one implementation, the method entails displaying to a user loading the trunk which of the first and second trunk compartments corresponds to the first and second objects.

In one implementation, the method entails outputting an alert to the user if the first object is placed erroneously in the second trunk compartment or if the second object is erroneously placed in the first trunk compartment. Alternatively, or additionally, if the user ignores the alert, the method may comprise inverting the designations of the cool and warm compartments and then heating and cooling the compartments based on the actual objects placed in the compartments to compensate for the user's erroneous placement of the objects in the compartments.

In one implementation, the method entails using a first thermal imager disposed in the first trunk compartment to sense a first object temperature and using a second thermal imager disposed in the second trunk compartment to sense a second object temperature. In this method, the thermal controller receives feedback signals from the first and second thermal imagers to automatically increase or decrease heating and/or cooling to the first and second trunk compartments based on the feedback signals.

In one implementation, the method entails using a thermal imager to generate thermal image data of the first and second objects, from which current temperatures of the first and second objects are determined. In this method the processor uses the current temperatures of the first and second objects to set the first and second setpoint temperatures for the first and second trunk compartments.

In one implementation, the method entails using a user interface to receive user input specifying how many trunk compartments to provide, wherein the processor processes the user input from the user interface and causes the plurality of actuators to displace the trunk dividers to divide the divisible trunk into a plurality of trunk compartments. Optionally, the method entails using a user interface to receive the setpoint temperatures as user input for each of the trunk compartments.

In one implementation, the method entails determining that the vehicle is driving autonomously without any occupants in the cabin and deactivating a climate control system for the cabin to divert energy to thermal control of the first and second trunk compartments.

In one implementation, the method entails receiving a travel time to a home destination associated with the vehicle, weather data, and a battery state of the vehicle and then generating the thermal control signal for the thermal controller.

In one implementation, the method entails notifying a user holding the first object to be placed in the divisible trunk that the first object has been identified by the machine-vision module.

In one implementation, the method entails notifying a user holding the first object to be placed in the divisible trunk that the first object has not been identified and providing instructions to the user to rotate the first object to enable an additional image of the first object to be captured.

In one implementation, the method entails notifying a user holding the object to be placed in the divisible trunk that the first object has not been identified and prompting the user to speak the name of the first object. This method further entails recognizing using a speech-recognition module the name of the first object spoken by the user and outputting a confirmation that the name of the first object has been recognized.

The vehicle may have a dashboard display screen to display a representation of the divisible trunk showing the first and second compartments. The dashboard display screen may also display the first and second setpoint temperatures and/or the first and second temperatures (actually measured temperatures). The dashboard display screen in one embodiment also includes a first user interface element to adjust the first setpoint temperature for the first trunk compartment and a second user interface element to adjust the second setpoint temperature for the second trunk compartment. The representation of the first and second compartments, setpoint temperatures, actual temperatures and user interface elements may alternatively, or additionally, be displayed on a mobile communication device paired to, or otherwise communicatively connected with, the vehicle.

In one implementation, the method entails transmitting trunk data to a mobile communication device to enable the mobile communication device to display a representation of the divisible trunk showing the first and second compartments divided by the trunk divider and also showing the first and second temperatures. This method may further entail displaying a user interface element on the mobile communication device to enable adjustment of the first and second temperatures via the mobile device communication device.

In one implementation, the method entails receiving a trunk-opening signal indicating that the trunk is being opened and causing the actuator to retract the trunk divider in response to receiving the trunk-opening signal. The method may optionally entail reducing or ending the cooling and/or heating in response to receiving the trunk-opening signal.

In one embodiment, the vehicle includes first and second humidifiers to independently humidify the first and second compartments. In another embodiment, the vehicle includes first and second dehumidifiers to independently dehumidify the first and second compartments. The vehicle may have both first and second humidifiers and first and second dehumidifiers. The vehicle may have first and second moisture sensors to provide humidity readings to the processor of the vehicle. A trunk climate control system may control the temperature and humidity of each compartment based on both temperature and humidity readings from temperature and humidity sensors in each compartment. It should be appreciated that in most embodiments the trunk climate control system is distinct and separate from the cabin climate control system. However, in an embodiment, it may be possible to have a single climate control system with two separate and distinct climate zones, i.e. the passenger cabin and the trunk, such that the two zones are separately cooled and/or heated.

These methods can be implemented in hardware, software, firmware or as any suitable combination thereof. That is, if implemented as software, the computer-readable medium comprises instructions in code which when loaded into memory and executed on a processor of a computing device causes the computing device to perform any of the foregoing method steps. These method steps may be implemented as software, i.e. as coded instructions stored on a computer readable medium which performs the foregoing steps when the computer readable medium is loaded into memory and executed by the microprocessor of the computing device. A computer readable medium can be any means that contain, store, communicate, propagate or transport the program for use by or in connection with the instruction execution system, apparatus or device. The computer-readable medium may be electronic, magnetic, optical, electromagnetic, infrared or any semiconductor system or device. For example, computer executable code to perform the methods disclosed herein may be tangibly recorded on a computer-readable medium including, but not limited to, a floppy-disk, a CD-ROM, a DVD, RAM, ROM, EPROM, Flash Memory or any suitable memory card, etc. The method may also be implemented in hardware. A hardware implementation might employ discrete logic circuits having logic gates for implementing logic functions on data signals, an application-specific integrated circuit (ASIC) having appropriate combinational logic gates, a programmable gate array (PGA), a field programmable gate array (FPGA), etc.

For the purposes of interpreting this specification, when referring to elements of various embodiments of the present invention, the articles "a", "an", "the" and "said" are intended to mean that there are one or more of the elements. The terms "comprising", "including", "having", "entailing" and "involving", and verb tense variants thereof, are intended to be inclusive and open-ended by which it is meant that there may be additional elements other than the listed elements.

This new technology has been described in terms of specific implementations and configurations which are intended to be exemplary only. Persons of ordinary skill in the art will appreciate that many obvious variations, refinements and modifications may be made without departing from the inventive concepts presented in this application. The scope of the exclusive right sought by the Applicant(s) is therefore intended to be limited solely by the appended claims.

The invention claimed is:

1. A vehicle comprising:
   a divisible trunk defining an enclosure for storing a first object and a second object;
   a camera to capture a first image of the first object prior to being placed into the divisible trunk and to capture a second image of the second object prior to being placed into the divisible trunk, the camera generating first image data of the first image and second image data of the second image;
   a processor communicatively connected to the camera to receive the first and second image data of the first and second images, wherein the processor executes a machine-vision module to process the first and second image data to identify the first and second objects;
   a trunk divider shaped and sized to divide the divisible trunk into a first trunk compartment and a second trunk compartment;
   an actuator connected to the trunk divider to displace the trunk divider from an inoperative position in which the divisible trunk is undivided to an operative position in which the divisible trunk is divided into the first and second trunk compartments;
   wherein the processor is configured to generate and output a divider signal to the actuator to cause the actuator to displace the trunk divider to divide the divisible trunk into the first and second trunk compartments; and
   wherein the processor generates and outputs a thermal control signal to a thermal controller to control a first temperature of the first trunk compartment by setting a first setpoint temperature for the first trunk compartment and to control a second temperature of the second trunk compartment by setting a second setpoint temperature for the second trunk compartment.

2. The vehicle of claim 1 comprising a radiofrequency transceiver for receiving object identification data identifying the first and second objects to be picked up by the vehicle operating autonomously, wherein the processor is communicatively coupled to the radiofrequency transceiver to pre-emptively actuate the trunk divider to divide the divisible trunk into the first and second compartments and to send the thermal control signal to the thermal controller to pre-emptively set the first and second setpoint temperatures for the first and second trunk compartments.

3. The vehicle of claim 2 wherein the processor causes the actuator to displace the trunk divider to pre-emptively divide the divisible trunk and to pre-emptively cause the thermal controller to set the first and second setpoint temperatures at a computed time prior to the vehicle autonomously opening the trunk, wherein the computed time is determined using a rate of cooling or heating of a heating or cooling element controlled by the thermal controller, a current trunk temperature and a current outside temperature.

4. The vehicle of claim 2 wherein the processor causes the actuator to displace the trunk divider to pre-emptively divide the divisible trunk and to pre-emptively cause the thermal controller to set the first and second setpoint temperatures a computed time prior to the vehicle autonomously arriving at a destination where the first and second objects are to be received into the trunk, wherein the computed time is determined using a rate of cooling or heating of a heating or cooling element controlled by the thermal controller, a current trunk temperature and a current outside temperature.

5. The vehicle of claim 2 wherein the processor determines that there is insufficient battery charge for the vehicle operating autonomously to provide a minimal amount of cooling or heating required for the first or second object to be delivered to a home destination, wherein the processor, in response to determining that there is insufficient battery charge, causes the radiofrequency transceiver to transmit notification data to a mobile communication device to cause the mobile communication device to process the notification data to display a notification that there is insufficient battery charge to deliver the first or second object to the home destination, wherein the notification includes a prompt to cancel an order for the first or second object.

6. The vehicle of claim 1 comprising a user interface to indicate to a user loading the trunk which of the first and second trunk compartments corresponds to the first and second objects.

7. The vehicle of claim 6 wherein the user interface outputs an alert to the user if the first object is placed erroneously in the second trunk compartment or if the second object is erroneously placed in the first trunk compartment.

8. The vehicle of claim 1 comprising a first thermal imager disposed in the first trunk compartment to sense a first object temperature and a second thermal imager disposed in the second trunk compartment to sense a second object temperature, wherein the thermal controller receives feedback signals from the first and second thermal imagers to automatically increase or decrease heating and/or cooling to the first and second trunk compartments based on the feedback signals.

9. The vehicle of claim 1 comprising a thermal imager to generate thermal image data of the first and second objects, from which current temperatures of the first and second objects are determined, wherein the processor uses the current temperatures of the first and second objects to set the first and second setpoint temperatures for the first and second trunk compartments.

10. The vehicle of claim 1 comprising:
a plurality of trunk dividers;
a plurality of actuators connected to the trunk dividers; and
a user interface to receive user input specifying how many trunk compartments to provide, wherein the processor processes the user input from the user interface and causes the plurality of actuators to displace the trunk dividers to divide the divisible trunk into a plurality of trunk compartments;
wherein the user interface is also configured to receive the setpoint temperatures as user input for each of the trunk compartments.

11. The vehicle of claim 1 wherein the processor is configured to determine that the vehicle is driving autonomously without any occupants in the cabin and, in response to determining that the vehicle has no occupants in the cabin, to deactivate a climate control system for the cabin to divert energy to thermal control of the first and second trunk compartments.

12. The vehicle of claim 1 wherein the processor is configured to receive a travel time to a home destination associated with the vehicle, weather data, and a battery state of the vehicle from which the processor is configured to generate and output the thermal control signal to the thermal controller.

13. The vehicle of claim 1 comprising a user interface to notify a user holding the first object to be placed in the divisible trunk that the first object has been identified by the machine-vision module.

14. The vehicle of claim 1 comprising a user interface visible to a user to notify a user holding the first object to be placed in the divisible trunk that the first object has not been identified and providing instructions to the user to rotate the first object to enable an additional image of the first object to be captured.

15. The vehicle of claim 1 comprising a user interface visible to a user to notify a user holding the object to be placed in the divisible trunk that the first object has not been identified and prompting the user to speak the name of the first object, wherein the processor is configured to recognize using a speech-recognition module the name of the first object spoken by the user and to output a confirmation that the name of the first object has been recognized by the processor.

16. The vehicle of claim 1 wherein the camera is disposed on an inside lid of the trunk.

17. The vehicle of claim 1 wherein the camera is a backup camera of the vehicle.

18. The vehicle of claim 1 comprising a dashboard display screen to display a representation of the divisible trunk showing the first and second compartments, the first and second setpoint temperatures, and the first and second temperatures, wherein the dashboard display screen also includes a first user interface element to adjust the first setpoint temperature for the first trunk compartment and a second user interface element to adjust the second setpoint temperature for the second trunk compartment.

19. The vehicle of claim 1 comprising a radiofrequency transceiver to transmit trunk data to a mobile communication device to enable the mobile communication device to display a representation of the divisible trunk showing the first and second compartments divided by the trunk divider and also showing the first and second temperatures, and further displaying a user interface element on the mobile communication device to enable adjustment of the first and second temperatures via the mobile device communication device, wherein the radiofrequency transceiver is configured to receive a temperature adjustment signal from the mobile communication device and to provide the temperature adjustment signal to the processor to adjust, via the thermal controller, the first setpoint temperature for the first trunk compartment and/or the second setpoint temperature for the second trunk compartment.

20. The vehicle of claim 1 wherein the processor is configured to receive a trunk-opening signal indicating that the trunk is being opened, wherein the processor is configured to cause the actuator to retract the trunk divider in response to receiving the trunk-opening signal and to send a deactivation signal to the thermal controller to cease thermal control of the first and second trunk compartments.

* * * * *